US005514946A

United States Patent [19]
Lin et al.

[11] Patent Number: 5,514,946
[45] Date of Patent: May 7, 1996

[54] BATTERY PACK INCLUDING STATIC MEMORY AND A TIMER FOR CHARGE MANAGEMENT

[75] Inventors: David S. Lin, Houston; Michael E. Schneider, Conroe, both of Tex.

[73] Assignee: Compaq Computer Corp., Houston, Tex.

[21] Appl. No.: 33,821

[22] Filed: Mar. 19, 1993

[51] Int. Cl.[6] .............................. H02J 7/04; H01M 10/44
[52] U.S. Cl. .................................. 320/31; 320/35; 320/39
[58] Field of Search .................................. 320/5, 14, 31, 320/32, 35, 36, 37, 38, 39, 40, 43, 44, 2, 48

[56] References Cited

U.S. PATENT DOCUMENTS

| | | | |
|---|---|---|---|
| 3,652,915 | 3/1972 | Eberts | 320/31 |
| 4,006,397 | 2/1977 | Catotti et al. | 320/31 |
| 4,061,956 | 12/1977 | Brown et al. | 320/22 |
| 4,118,661 | 10/1978 | Siekierski et al. | 320/40 |
| 4,153,867 | 5/1979 | Jungfer et al. | 320/43 |
| 4,209,736 | 6/1980 | Reidenbach | 320/22 |
| 4,225,815 | 9/1980 | Lind et al. | 320/39 |
| 4,371,826 | 2/1983 | Shelly | 320/21 |
| 4,377,787 | 3/1983 | Kikuoka et al. . | |
| 4,392,101 | 7/1983 | Saar et al. | 320/20 |
| 4,413,221 | 11/1983 | Benjamin et al. | 320/14 X |
| 4,418,310 | 11/1983 | Bollinger | 320/39 |
| 4,433,277 | 2/1984 | Carollo et al. | 320/24 |
| 4,455,523 | 6/1984 | Koenck | 320/43 |
| 4,553,081 | 11/1985 | Koenck | 320/43 |
| 4,609,860 | 9/1986 | Fasen | 320/14 |
| 4,629,965 | 12/1986 | Fallon et al. | 320/39 |
| 4,651,081 | 3/1987 | Nishimura et al. | 320/31 X |
| 4,670,703 | 6/1987 | Williams | 320/22 |
| 4,677,363 | 6/1987 | Kopmann | 320/44 |
| 4,709,202 | 11/1987 | Koenck et al. | 320/43 |
| 4,724,528 | 2/1988 | Eaton | 320/43 X |
| 4,746,854 | 5/1988 | Baker et al. | 320/40 |

(List continued on next page.)

FOREIGN PATENT DOCUMENTS

| | | |
|---|---|---|
| 0225106 | 10/1987 | European Pat. Off. . |
| 0502623 | 9/1992 | European Pat. Off. . |
| 3901096 | 8/1989 | Germany . |
| 0316643 | 12/1988 | Japan . |
| 0616688 | 7/1978 | U.S.S.R. . |
| 1190429A | 12/1988 | U.S.S.R. . |
| 2121971 | 1/1984 | United Kingdom . |
| 2257315 | 1/1993 | United Kingdom . |
| WO9108494 | 6/1991 | WIPO . |
| WO93/15412 | 9/1993 | WIPO . |
| WO94/01784 | 1/1994 | WIPO . |

*Primary Examiner*—Peter S. Wong
*Assistant Examiner*—Edward Tso
*Attorney, Agent, or Firm*—Pravel, Hewitt, Kimball & Krieger

[57] ABSTRACT

A battery pack for a computer system including static memory to maintain battery operating parameters and charge information, a real time clock (RTC) for measuring periods of non-use of the battery and a communication circuit to exchange the battery information with a microcontroller located in the computer system. The static memory, RTC and communication circuit is preferably in the form of a single RAM/RTC chip. The battery pack also includes circuitry to maintain power to the RAM/RTC from the battery if AC power is not available. The microcontroller detects the presence of the battery and retrieves the present time from the RTC, a timestamp indicating time or removal of the battery and other operating parameters and charge information from the battery pack, and controls the charging functions of the battery accordingly. The microcontroller also updates the charge information of the battery pack while performing other housekeeping functions of a DC—DC converter. The microcontroller further controls a switch located in the charge path of the battery to control fast charging. Trickle charge is simulated by pulsing the switch at a predetermined duty cycle and period. The microcontroller may be placed in standby to conserve energy, while also monitoring the standby switch to pull the computer system out of standby mode if the standby switch is pressed. This allows the keyboard controller to be shut off during standby mode to conserve energy.

34 Claims, 15 Drawing Sheets

U.S. PATENT DOCUMENTS

| | | | |
|---|---|---|---|
| 4,767,977 | 8/1988 | Fasen et al. | 320/20 |
| 4,775,827 | 10/1988 | Ijntema et al. | 320/44 |
| 4,803,416 | 2/1989 | Abiven et al. | 320/44 |
| 4,820,965 | 4/1989 | Siemer | 320/31 |
| 4,843,299 | 6/1989 | Hutchings | 320/31 |
| 4,918,368 | 4/1990 | Baker et al. | 320/40 |
| 4,947,123 | 8/1990 | Minezawa | 320/48 X |
| 4,961,043 | 10/1990 | Koenck | 320/21 |
| 4,977,393 | 12/1990 | Arnold et al. | 320/31 X |
| 5,012,176 | 4/1991 | LaForge | 320/31 |
| 5,047,961 | 9/1991 | Simonsen . | |
| 5,049,804 | 9/1991 | Hutchings | 320/21 |
| 5,168,206 | 12/1992 | Jones . | |
| 5,204,611 | 4/1993 | Nor et al. | 320/39 X |
| 5,218,288 | 6/1993 | Mickal et al. | 320/43 X |
| 5,363,312 | 11/1994 | Ninomiya | 320/38 X |

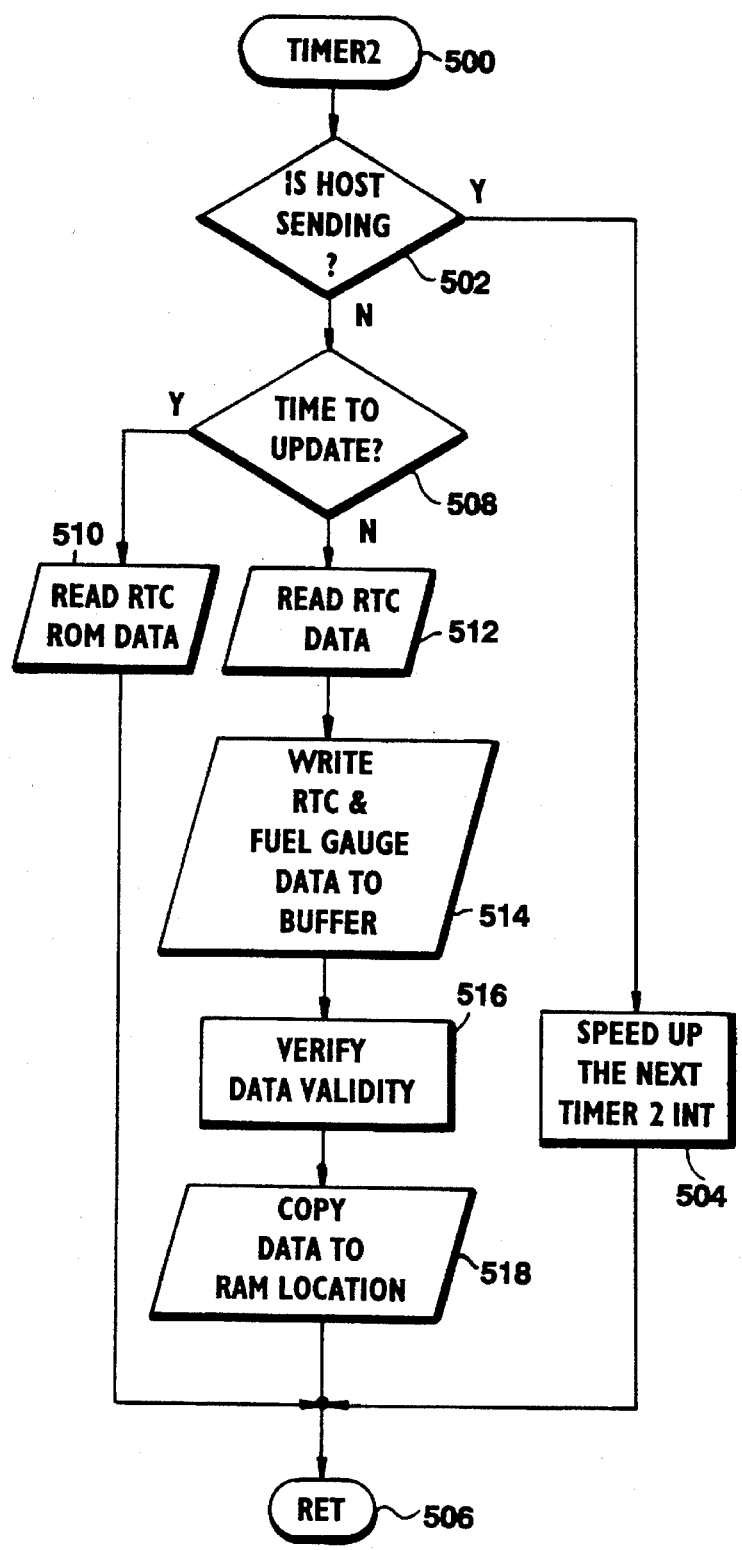
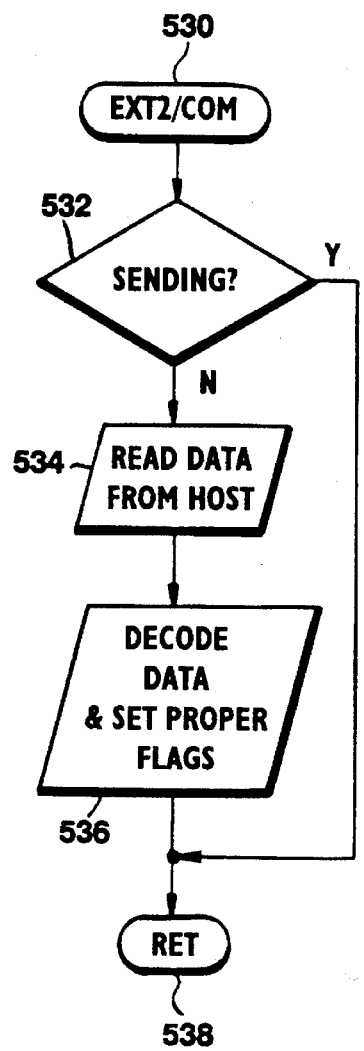
Fig. 7
Fig. 6

BATTERY PACK INCLUDING STATIC MEMORY AND A TIMER FOR CHARGE MANAGEMENT

BACKGROUND OF THE INVENTION

1. Field of the Invention

The present invention relates to a battery pack for a computer system including static memory to retain battery operating parameters and charge information and a real time clock for measuring periods of non-use.

2. Description of Related Art

Computers are often needed in locations where AC power is not available. Rechargeable batteries are typically used as an alternative source of power, such as nickel-based batteries including nickel cadmium (NiCad) and nickel metal hydride (NiMH) batteries, which are capable of providing power to a portable or pen-based computer for several hours. Since rechargeable batteries have a limited cycle life, it is desirable to maximize the life of and to obtain the maximum power from each battery during every discharge cycle. To achieve these goals, it is necessary to fully and efficiently charge the battery without causing temperature abuse as a result of overcharging.

Many battery chargers presently in use do not efficiently charge a rechargeable battery, thereby limiting the useful life of the battery. The total charge capacity of a battery, typically referred to as the amp-hour (Ah) rating or otherwise called the milliamp-hour rating (mAh), tends to change over time and usage. For example, the charge of a battery typically increases and then decreases over time and usage until the battery eventually will not hold a charge and must be replaced. In particular, NiCad batteries exhibit a memory effect causing lower capacity after multiple partial charge and discharge cycles have occurred. Some battery chargers monitor the temperature and voltage to avoid fast charging when the battery voltage is too low or when the battery temperature is not within an acceptable fast charging temperature range. Examples are disclosed in U.S. Pat. Nos. 5,136,231 and 5,382,893. These and most other known battery chargers do not have the capability to accurately determine the charge level and the total charge capacity and thus may still overcharge the battery, thereby further reducing its useful life.

The primary reason for temperature abuse and overcharging of nickel-based batteries was the difficulty of determining the charge level since the voltage is substantially the same regardless of the charge level. Furthermore, if the battery was removed and then later re-installed, the system had no way of determining the charge history and the remaining charge level of the battery. Some methods estimated the charge level by monitoring the charge and discharge current through the battery over a period of time, but these methods still assumed an initial level of charge. These methods proved inaccurate when a partially discharged battery was used. Although the level of discharge may be measured for a single dedicated battery in a particular system, the battery is typically interchangeable with another in many systems, so that the system has no way of determining the charge level of a given battery. Also, rechargeable batteries tend to discharge during periods of non-use, referred to as self-discharge, so that a system which was shut off for a period of time and then powered up could not determine the amount of self-discharge that had occurred.

One particular technique used in personal computers, known as "Battery Watch", estimates the amount of charge remaining based on the lapsed time of charge and discharge, and converts this to the useful time remaining. This technique has proven unreliable since it assumes that the total charge capacity of a battery does not change over time. Further, this technique fails to keep track of the charge-in and charge-out and does not account for the self-discharge.

One approach to solve most of these problems is disclosed in U.S. Pat. No. 5,315,228. A battery pack was disclosed which included a nickel-based battery, a microcontroller circuit and memory. Since the microcontroller circuitry was contained within the battery pack, it was capable of monitoring the battery charge status at all times by continually sampling the charge and discharge current through the battery as well as the battery voltage and temperature while charging. The microcontroller used the battery charge status information to accurately calculate the total charge capacity and the remaining charge level in the battery. The memory stored the charge information and a communication means was provided to transfer the stored information to a computer system when the battery pack was installed in the computer.

The advantages of this system include the ability to recalculate the total capacity of the battery over time, to provide a fuel gauge to continually measure the remaining charge level of the battery at any given time and the ability to measure the battery self-discharge during periods of non-use. The local battery circuitry also controlled battery charging and used the above calculations to determine the optimal point of fast charge termination for the battery. Essentially, all charging functions and control were provided in the battery pack, alleviating the need for the computer system to determine when a new battery was placed into the system and how to charge the battery.

It has been discovered that the use of microcontroller circuitry in the battery pack is relatively expensive and also reduces battery shelf-life since the microcontroller circuit continuously draws a significant amount of current from the battery during periods of non-use. The power consumption is particularly relevant when the size and charge capacity of the nickel-based battery itself is reduced for purposes of convenience and cost. The microcontroller circuitry consumes valuable space and adds cost since it must be purchased with each battery pack. Computer designers must seek new ways to maximize power consumption efficiency and valuable space to meet the needs of the computer market. This is particularly pertinent with the advent of pen-based computer systems where size, cost and power usage are critical.

It is desirable, therefore, to keep track of the particular battery statistics and charge status, including total capacity over time as well as the instantaneous charge level at any given time, taking into account periods of self-discharge and reduced capacity. It is further desirable maximize the useful power of the battery while keeping the size of the battery as small as possible.

SUMMARY OF THE INVENTION

A battery charge monitoring system according to the present invention includes a battery pack which further includes a battery, a timer and static memory to keep track of the operating parameters and charge status of the battery at all times, and communication means to report the battery information. A microcontroller is provided in the DC—DC converter of the computer system to retrieve and update battery information from the battery pack, to control charging functions of the battery, to report charge status and information of the battery to the host computer and also to perform other housekeeping functions of the DC—DC converter. The housekeeping functions include auxiliary battery detection and operation, low battery voltage detection and operations, power and standby detection and control, and communication with the host computer. The static memory within the battery pack preferably includes a read only memory (ROM) and a random access memory (RAM). A communication link is also provided in the battery pack to communicate with the microcontroller, where the communication link is preferably implemented as a single line or one-wire serial link to reduce the number of battery pack terminals.

In the preferred embodiment, the operating parameters stored in the ROM memory of the battery pack includes a family code and battery type, maximum charge temperature, low voltage set points, initial rated total capacity and self-discharge rates for several time periods. The timer is preferably a real time clock (RTC) preferably in the form of a binary counter measuring elapsed time in seconds and providing an indication of the present time. The microcontroller regularly retrieves and stores a timestamp value from the RTC and stores the timestamp back into the RAM in the battery pack, so that when the battery is removed, the stored timestamp indicates the time the battery pack was removed. The RAM also stores two fuel gauge values including a numerator representing the remaining charge on the battery and a denominator representing an updated version of the total capacity of the battery.

The microcontroller in the DC—DC converter detects power up or new battery pack installation in the system and retrieves the stored data, so that the microcontroller can determine the charge startup and operating conditions of the battery. The numerator and denominator values are read and checked for validity to determine the remaining and total charge capacities. The RTC present time value is read and compared to the timestamp value to determine elapsed time indicating the amount of self-discharge. The self-discharge rates are read and the time of self-discharge is converted to lost charge using the self-discharge rates and subtracted from the retrieved numerator to update the numerator. A new timestamp value and numerator are stored to update the battery pack, and these values are updated regularly during operation. Note that the numerator indicates the level of charge at the time of the timestamp. The denominator value in the battery pack is also updated after a full charge and discharge cycle occurs so that a good approximation of the total capacity of the battery is maintained. The microcontroller also includes one or more communication lines to provide the battery status and statistics to the host computer on a periodic basis or when requested.

Since the microcontroller circuitry is moved to the DC—DC converter from the battery pack and since the battery pack includes the static memory and a timer, all the advantages of maintaining battery parameters and tracking battery charge status are achieved while also reducing the size and cost of the battery pack and increasing the battery pack shelf-life. In the preferred embodiment, the static memory comprising RAM and ROM, the RTC and the communication circuitry are all provided on a single chip. Furthermore, the battery pack includes circuitry to use power from the AC adapter when available to prevent the RAM/RTC from draining power from the battery, which maximizes the life of the battery.

The DC—DC controller further includes a convenient and cost effective method to trickle charge the battery upon completion of fast charge. To implement fast charging, a transistor switch, preferably comprising an N-channel metal oxide semiconductor field effect transistor (MOSFET), is placed in the charge path of the battery and controlled by the microcontroller. The microcontroller turns on the transistor switch to allow the AC adapter to fast charge the battery. A trickle or top off charge is then applied to the battery for a period of time after fast charging is completed to increase the useful life of the battery. In the preferred embodiment, the microcontroller controls the pulse trickle charge by pulsing the MOSFET on and off for approximately 2 hours, where the pulse signal has a period preferably between 1–2 seconds and duty cycle of approximately 5–10%. The pulse charging technique simulates trickle charge since the average amount of current during pulse charging is roughly equivalent to the steady state trickle charge current level typically used. The MOSFET is then turned off and a resistor in parallel with the MOSFET allows a maintenance charge to flow through the battery to maintain its charge level. In this manner, the microcontroller simulates trickle charging, which would otherwise require extra trickle charge and sophisticated current measuring circuitry, such as the current regular and measuring circuits described in U.S. Pat. No. 5,136,231 entitled "Ni-Cad Battery Charge Rate Controller."

The microcontroller is capable of being placed in standby mode to reduce power consumption when the computer system is not being used for a period of time. A standby switch operated by the user of the computer system is also provided which was typically monitored by the keyboard controller. Since the keyboard controller had to remain powered-up to monitor the standby switch, and since the keyboard controller draws a significant amount of power, the computer system still consumed a significant amount of power while in standby. One solution was to provide a special ASIC to monitor the standby switch to allow the keyboard controller to shut down. This solution, however, is expensive. In the preferred embodiment of the present invention, the microcontroller in the DC—DC converter monitors the standby switch and controls standby mode to allow the keyboard controller to be shut down and to eliminate the need for special monitoring circuitry or an ASIC.

BRIEF DESCRIPTION OF THE DRAWINGS

A better understanding of the present invention can be obtained when the following detailed description of the preferred embodiment is considered in conjunction with the following drawings, in which:

FIG. 6 is a flowchart diagram illustrating an update RAM/RTC routine executed by the microcontroller of FIG. 3; and FIG. 7 is a flowchart diagram illustrating a host serial receive routine executed by the microcontroller of FIG. 3.

DETAILED DESCRIPTION OF THE PREFERRED EMBODIMENT

Figure 1:
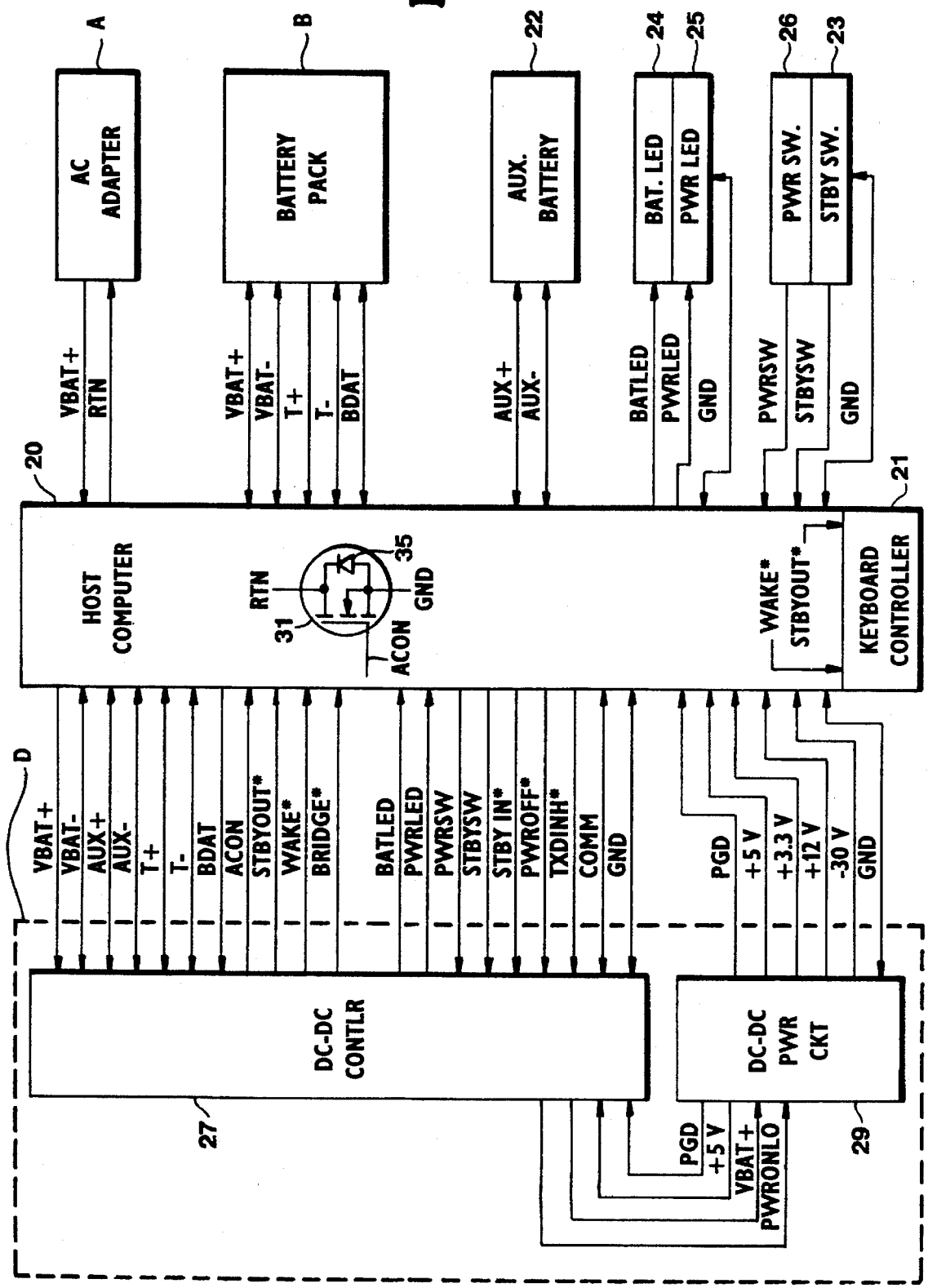
FIG. 1 is a schematic block diagram of a computer system using a charge management battery pack according to the present invention.

Referring now to FIG. 1, a computer system C is shown which uses a charge management battery pack B according to the present invention. The computer system C includes a host computer 20 which preferably includes a DC—DC converter D. The computer system C is preferably configured to receive the removably connected battery pack B, a removably connected auxiliary battery 22 and a removably connected AC adapter A. Although shown separately, the DC—DC converter D is preferably a subsystem of and contained within the host computer 20. Two light emitting diodes (LEDs) are provided and connected to the host computer 20, including a battery LED 24 activated by a signal BATLED and a power LED 25 activated by a signal PWRLED. These signals are referenced to a signal GND, otherwise referred to as ground. A momentary power switch 26 and a momentary standby switch 23 each provide a low pulse on a PWRSW signal and a STBYSW signal, respectively, to the host computer 20 when the corresponding switch is pressed by the user of the computer system C. The power switch 26 toggles the computer system C on and off upon consecutive presses, whereas the standby switch 23 is used to place the computer system C in or out of standby mode upon consecutive presses.

The AC adapter A converts AC voltage from an AC line to a generally unregulated DC voltage ranging between 10 and 18 volts between a signal VBAT+ and a signal RTN. The AC adapter A preferably does not include a power switch, but is considered powered on when connected to the AC line and to the host computer 20, and considered powered off otherwise. When the AC adapter A is present and powered on, it provides the main power source for the computer system C and also to charge a rechargeable battery 28 (FIG. 2) within the battery pack B. The battery 28 provides power to the computer system C when the AC adapter A is powered off. The battery 28 is preferably a 10 cell nickel-based battery, such as a nickel cadmium (NiCad) or a nickel-metal hydride (NiMH) battery, where each cell preferably has a nominal voltage of 1.2 volts. Thus, the battery 28 preferably provides a nominal voltage of approximately 12 volts, although its voltage may vary significantly depending upon its charging condition and remaining charge level. In any event, the voltage across the battery 28 should not exceed 17 volts.

The battery 28 preferably has a nominal capacity of approximately 2.2 amp-hours (Ah), where the Ah capacity generally defines the full charge capacity of a rechargeable battery, although the charge capacity typically changes over time and usage. In practice, the original Ah capacity rating is derived from the battery cell manufacturer's specification sheet, by calculating the total number of coulombs provided by discharging a fully charged battery cell until its voltage becomes equal to a discharge voltage level, which is preferably 1.0 volts for each cell, or approximately 10 volts for the battery 28. Since the total capacity of the battery 28 changes over time and usage, a measure of the full charged capacity, otherwise referred to as the denominator, is recalibrated and stored after a full charge cycle, described below, to keep track of the changing full charge capacity of the battery 28 over time. The remaining charge level of the battery 28, otherwise referred to as the numerator, is regularly monitored and updated.

An N-channel metal oxide semiconductor field effect transistor (MOSFET), referred to as the AC MOSFET 31, is preferably located within the host computer C and has its drain coupled to the RTN signal, its source coupled to the GND signal and its gate receiving a signal referred to as ACON. An inherent diode 35 is provided within the AC MOSFET 31 having its anode connected to the source and its cathode connected to the drain of the AC MOSFET 31. Even if the AC MOSFET 31 is off, its diode 35 is forward biased when the AC adapter A is powered on, allowing the AC adapter A to provide power to the computer system C. As will be described below, the DC—DC converter D detects the presence of the AC adapter A and asserts the ACON signal high, which activates or turns on the AC MOSFET 31, bypassing its inherent diode 35. The AC MOSFET 31 is provided to prevent discharging of the battery 28 when the AC adapter A is connected to the host computer 20 but powered off.

The battery 28 of the battery pack B has its positive terminal coupled to the VBAT+ signal when installed in the computer C, and its negative terminal providing a signal VBAT–. The battery pack B also includes a temperature sensor TS connected between signals T+ and T– for providing a signal indicative of the temperature of the battery 28. When the battery pack B is installed, the T– signal is connected to ground. A signal BDAT allows a one-wire serial communication port between the battery pack B and the DC—DC converter D, as will be further described below.

The auxiliary battery 22 provides a voltage range of preferably approximately 6–8 volts between signals AUX+ and AUX–, and preferably has a capacity of 50 mAh. The auxiliary battery 22 is used to provide power to the computer system C while changing the battery pack B with a similar battery pack. As will be described in more detail below, the computer system C must be in a standby mode before the auxiliary battery 22 provides power, since the auxiliary battery 22 is capable of sustaining a fully loaded computer system C for only approximately 1 minute in standby mode to facilitate replacement of the battery pack B.

The DC—DC converter D includes a DC—DC controller 27 and a DC—DC power circuit 29, both of which are connected to the host computer 20. The DC—DC controller 27 is connected to the VBAT+, VBAT–, AUX+, AUX–, T+, T–, PWRSW, STBYSW and BDAT signals as well as GND. The PWRSW signal is debounced by the DC—DC controller 27, where the DC—DC controller 27 asserts a signal PWRONLO in response to activate the DC—DC power circuit 29. The DC—DC power circuit 29 is then activated, providing power signals +5 V, +3.3 V, +12 V and –30 V having regulated voltage levels of approximately 5 volts, 3.3 volts, 12 volts and –30 volts, respectively, to the host computer 20.

The DC—DC power circuit 29 is preferably a buck-type pulse width modulated DC—DC converter operating in the flyback mode. It converts an unregulated DC voltage from either the battery 28 or the AC adapter A into the regulated voltages listed above. The DC—DC power circuit 29 includes a power-on delay and comparator circuit (not shown), which is initiated upon receipt of the PWRONLO signal. The delay circuit asserts a power good signal PGD to the DC—DC controller 27 and to the host computer 20 upon expiration of the delay if the +5 V, +3.3 V, +12 V and –30 V power signals are all within proper tolerance levels. The VBAT+ signal is provided to the DC—DC power circuit 29 from the DC—DC controller 27, and the DC—DC power circuit 29 provides the +5 V signal to the DC—DC controller 27.

The DC—DC controller 27 receives and debounces the STBYSW signal. In response to receiving a low pulse on the STBYSW signal, the DC—DC controller 27 asserts a signal STBYOUT* low to a keyboard controller 21 within the host computer 20 to initiate the standby mode. An asterisk at the end of a signal name denotes negative logic, where the signal is asserted low and negated high unless otherwise stated. The host computer 20 responds to receiving the STBYOUT* signal asserted low by asserting a signal STBYIN* low to the DC—DC controller 27 to initiate standby mode. The keyboard controller 21 enters into an internal power down mode during standby to conserve energy. The DC—DC controller 27 also enters into a low power mode during standby, although it is awakened on a periodic basis.

The DC—DC controller 27 includes a microcontroller 72 (FIG. 3B), which is preferably programmed to bring the computer system C out of standby mode using a signal referred to as WAKE*. The keyboard controller 21 receives the WAKE* signal to execute required functions during standby. Other devices, such as an external modem (not shown), may wake up the computer system C or pull it out of standby mode. This is not desired, however, if the computer system C is being powered solely by the auxiliary battery 22 since it may drain too quickly preventing reliable operation. A signal BRIDGE* is asserted low by the DC—DC controller 27 to prevent wakeup in this case. The host computer 20 may be programmed to shut down by asserting a signal PWROFF* to the DC—DC controller 27 to initiate power down operations.

The DC—DC converter D communicates to the host computer 20 through a serial communication signal referred to as COMM. The DC—DC converter D broadcasts information to the host computer 20 on the COMM signal unless the host computer 20 asserts a signal TXDINH* low. When the TXDINH* signal is asserted low by the host computer 20, it can transmit data to the DC—DC converter D on the COMM signal.

The DC—DC controller 27 constantly monitors the functions of the computer system C to determine the mode and whether power is being provided by the AC adapter A, the battery pack B or the auxiliary battery 22. The DC—DC controller 27 allows normal operation as long as the VBAT+ signal rises above a predetermined minimum voltage level, which is preferably approximately 10 volts. If the VBAT+ signal falls below this minimum voltage level during normal operation, the DC—DC controller 27 shuts down the computer system C.

The battery LED 24 generally indicates the charge and voltage status of the battery 28. If the battery 28 is being fast charged, then the BATLED signal is asserted continuously so that the battery LED 24 remains on. During operation using the battery 28 alone, if the voltage of the battery 28 falls below a predetermined first voltage level or set point, referred to as LOWBAT1, the DC—DC controller 27 informs the host computer 20 through communication on the COMM signal, and preferably asserts a 1 Hertz (Hz) signal on the BATLED signal so that the battery LED 24 blinks at a 1 Hz rate. The LOWBAT1 set point voltage is preferably approximately 11.5 volts. The host computer 20 also beeps to inform the user. If the computer system C is in standby mode, a slightly higher set point voltage is used, referred to as SLOWBAT1, which is preferably approximately 11.7 volts.

If the voltage of the battery falls below a second, lower predetermined voltage set point, referred to as LOWBAT2, the DC—DC controller 27 informs the host computer 20 in a similar manner and preferably asserts a 2 Hz signal on the BATLED signal so that the battery LED 24 blinks at a 2 Hz rate. The LOWBAT2 voltage set point is preferably approximately 11.2 volts unless in standby, where a slightly higher voltage set point, referred to as SLOWBAT2, is used which is preferably approximately 11.4 volts. Again, the host computer 20 informs the user with a beep. Note that the standby set points are both 200 mV higher than the corresponding regular set points.

The user may replace the battery pack B with a fresh battery pack when the computer system C is operating by first pressing the standby switch 23 to place the computer system C in standby, and then removing the discharged battery pack B. The user preferably has at least one minute, during which time the auxiliary battery 22 provides power to the computer system C while in standby. After a new battery pack is installed, the user presses the standby switch 23 to pull the computer system C out of standby mode. If the user fails to replace the battery pack B with a fresh pack, or otherwise does not connect the AC adapter A, the DC—DC controller 27 shuts down the computer system C if the VBAT+ signal falls below the minimum voltage level of 10 volts.

Figure 2:
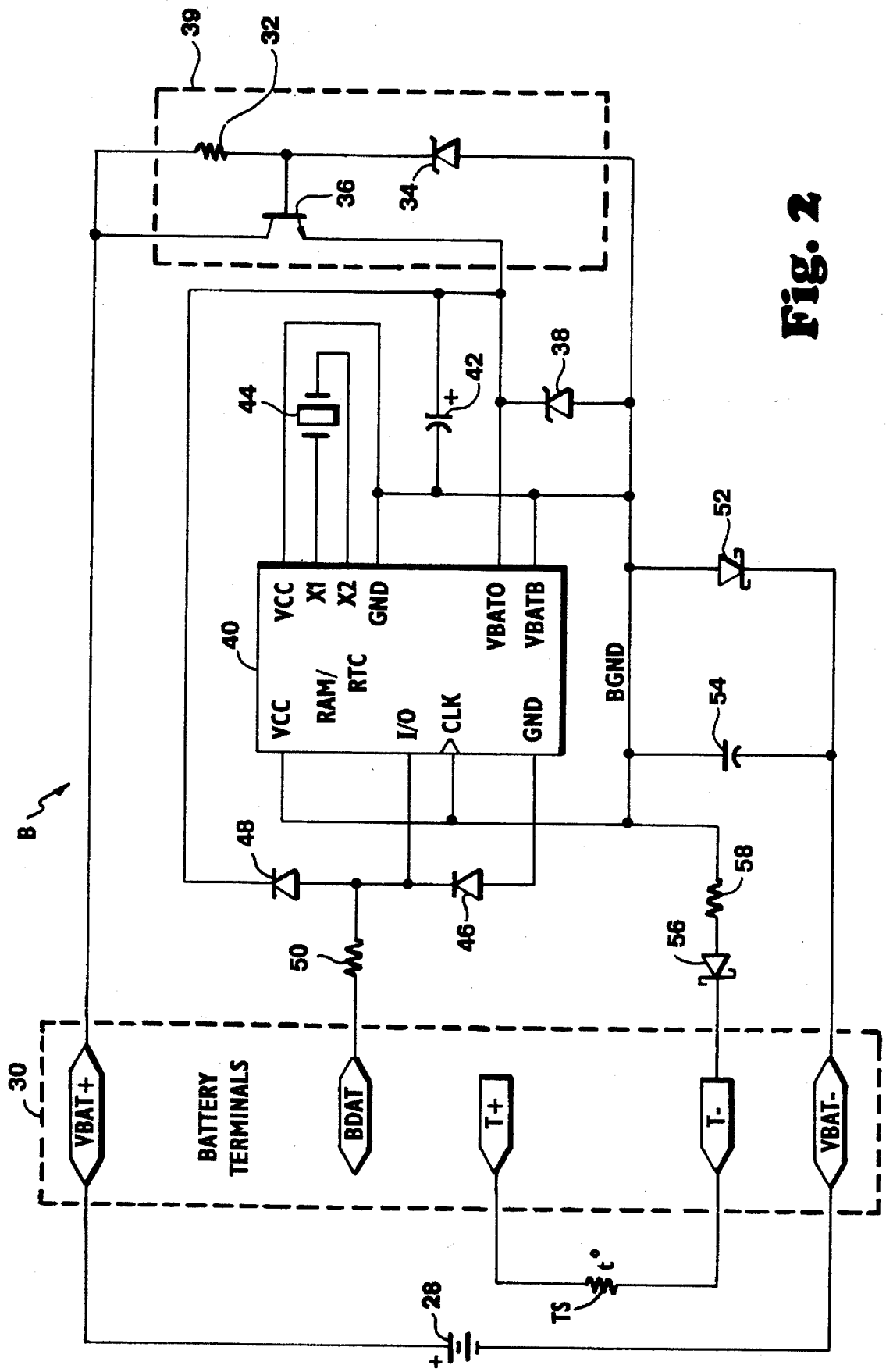
FIG. 2 is a schematic diagram of the battery pack of FIG. 1.

Referring now to FIG. 2, a schematic diagram of the battery pack B is shown which includes charge management circuitry according to the present invention. The terminals of the battery pack B are shown collectively as terminals 30 and labeled with the corresponding signal names. The temperature sensor TS is preferably a thermistor coupled in good thermal contact with the battery 28 having a nominal resistance of approximately 10 k$\Omega$ at a temperature of 25 degrees Celsius (°C.), and having a negative temperature coefficient so that its resistance changes proportionately with its temperature. The circuit connected to the temperature sensor TS and used to measure the temperature of the battery 28 is described more fully below.

The VBAT+ signal is connected to one side of a resistor 32 and to the collector of an NPN transistor 36. The other side of the resistor 32 is connected to the cathode of a Zener diode 34 and to the base of the transistor 36. The Zener diode 34 preferably has a reverse breakdown voltage of 5.6 volts and the transistor 36 is preferably a 2222-type transistor. The anode of the Zener diode 34 is connected to a local battery ground, referred to as BGND, which is also connected to the anode of another Zener diode 38. The Zener diode 38 preferably has a reverse breakdown voltage of 5.1 volts, and has its cathode connected to the emitter of the transistor 36. The Zener diode 38 provides surge protection for the RAM/RTC 40. A filter capacitor 42 is coupled between the emitter of the transistor 36 and BGND. The resistor 32, the Zener diode 34 and the transistor 36 serve as an emitter follower regulator 39 coupled between the VBAT+ and BGND signals to provide a relatively constant 5 volts at the emitter of the transistor 36.

The BGND signal is connected to the GND, CLK, VCC, and VBATB pins of a DS1608 EconoRAM Time Chip, referred to as the RAM/RTC 40, which is manufactured by Dallas Semiconductor. The DS1608 is preferably used since it conveniently includes an internal static RAM and a ROM for storing the operating parameters and charge status information of the battery 28, a real time clock (RTC) for measuring periods of non-use of the battery 28, and a 1-wire serial communication capability for exchanging information of the battery 28 with the DC—DC converter D. Other similar type of devices performing similar functions could be used, such as the DS2404 also manufactured by Dallas Semiconductor, or an ASIC incorporating the described functions, to name a couple of examples.

The emitter of the transistor 36 is connected to a VBATO pin of the RAM/RTC 40. A crystal oscillator 44 is connected between the X1 and X2 pins of the RAM/RTC 40, where the crystal 44 preferably has an oscillating frequency of approximately 32.768 kHz and an inherent capacitance of 6 pF. It is noted that if the VBATO pin is used to provide power to the RAM/RTC 40, then the VCC and VBATB pins must be grounded for proper operation.

A diode 46 has its anode connected to the BGND signal and its cathode connected to an input/output (I/O) pin of the RAM/RTC 40. The I/O pin is also connected to the anode of a diode 48 and to one side of a resistor 50, where the cathode of the diode 48 is connected to the VBATO pin. The other side of the resistor 50 provides the BDAT signal. The diodes 46 and 48 protect the RAM/RTC 40 from overvoltage swings of the BDAT signal. The I/O pin of the RAM/RTC 40 provides the one-wire serial communication port for transferring serial data to and from the RAM and ROM portions of the RAM/RTC 40. The details of this serial communication is fully documented in the specification sheets by the manufacturer and will not be described. The data stored in the RAM/RTC 40 will be described more fully below.

The BGND signal is connected to the anode of a Schottky diode 52 having its cathode connected to the VBAT– signal. A filter capacitor 54 is also coupled between the BGND and VBAT– signals. Another Schottky diode 56 has its cathode connected to the T– signal and its anode connected to one side of a current limit resistor 58, where the other side of the resistor 58 is connected to the BGND signal. The resistor 58 essentially limits excessive charge current through the Schottky diode 56 when the battery 28 is initially installed and the VBAT– signal is momentarily connected before the T– signal. The Schottky diodes 52 and 56 operate in conjunction with the emitter follower regulator 39 to provide a relatively constant 5 volts to the RAM/RTC 40 regardless of whether power is being provided by the battery 28 or the AC adapter A. When the battery pack B is not installed, the T– signal is left floating so that the Schottky diode 56 is biased off and the VBAT– signal provides a ground through the Schottky diode 52. If the battery pack B is installed, the T– signal is connected to system GND. However, if the AC adapter A is not connected or is not powered on, the Schottky diode 56 is still biased off and the Schottky diode 52 is biased on.

When battery pack B is installed and the AC adapter A is also installed and powered on, the AC adapter A attempts to pull the voltage between the VBAT+ and GND signals to 18 volts, so that the voltage across the VBAT+ and GND signals exceeds the voltage across the battery 28 or across the VBAT+ and VBAT– signals. Thus, the diode 52 is biased off and the diode 56 is biased on, so that the T– signal provides a reference ground for the battery pack B. In any the case, the emitter follower regulator 39 maintains a constant 5 volts to the RAM/RTC 40 whether powered by the battery 28 or the AC adapter A, and the AC adapter A powers the RAM/RTC 40 when available.

Figure 3:
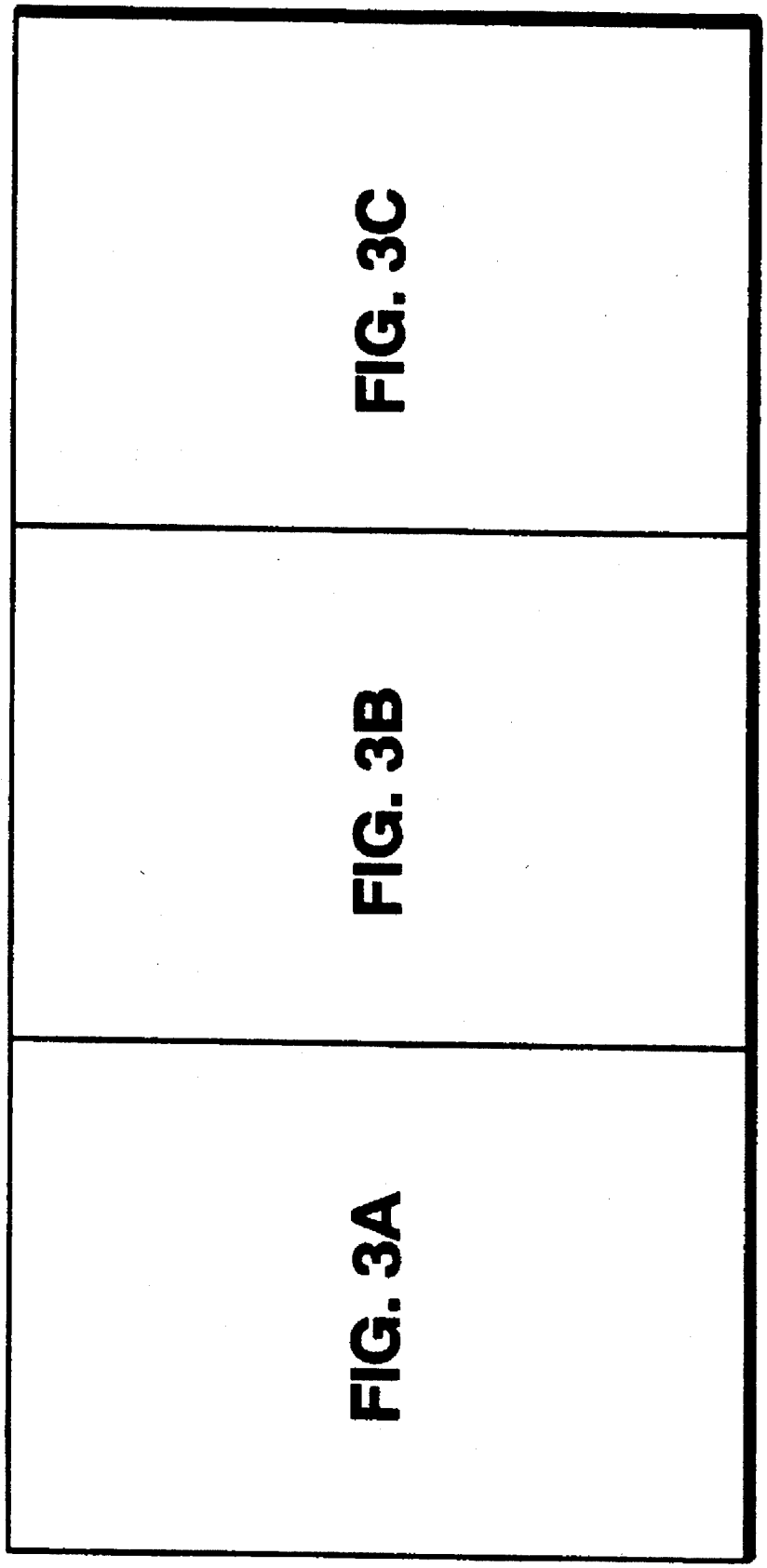
FIG. 3 is a block diagram showing the alignment of the block and schematic diagram of FIGS. 3A–3C.
Figure 3A:
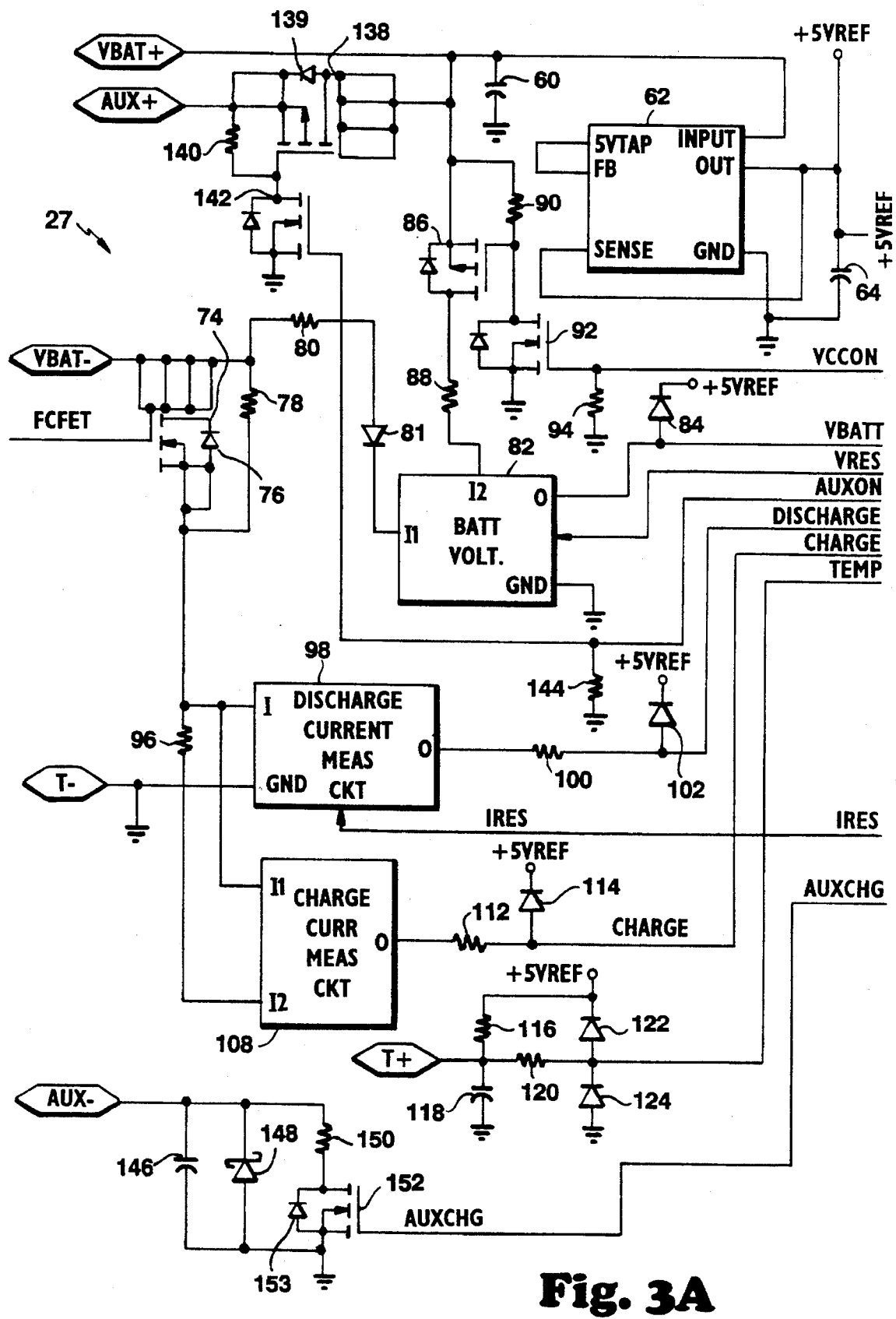
FIGS. 3A–3C are schematic and block diagrams of the DC—DC controller of FIG. 1.
Figure 3B:
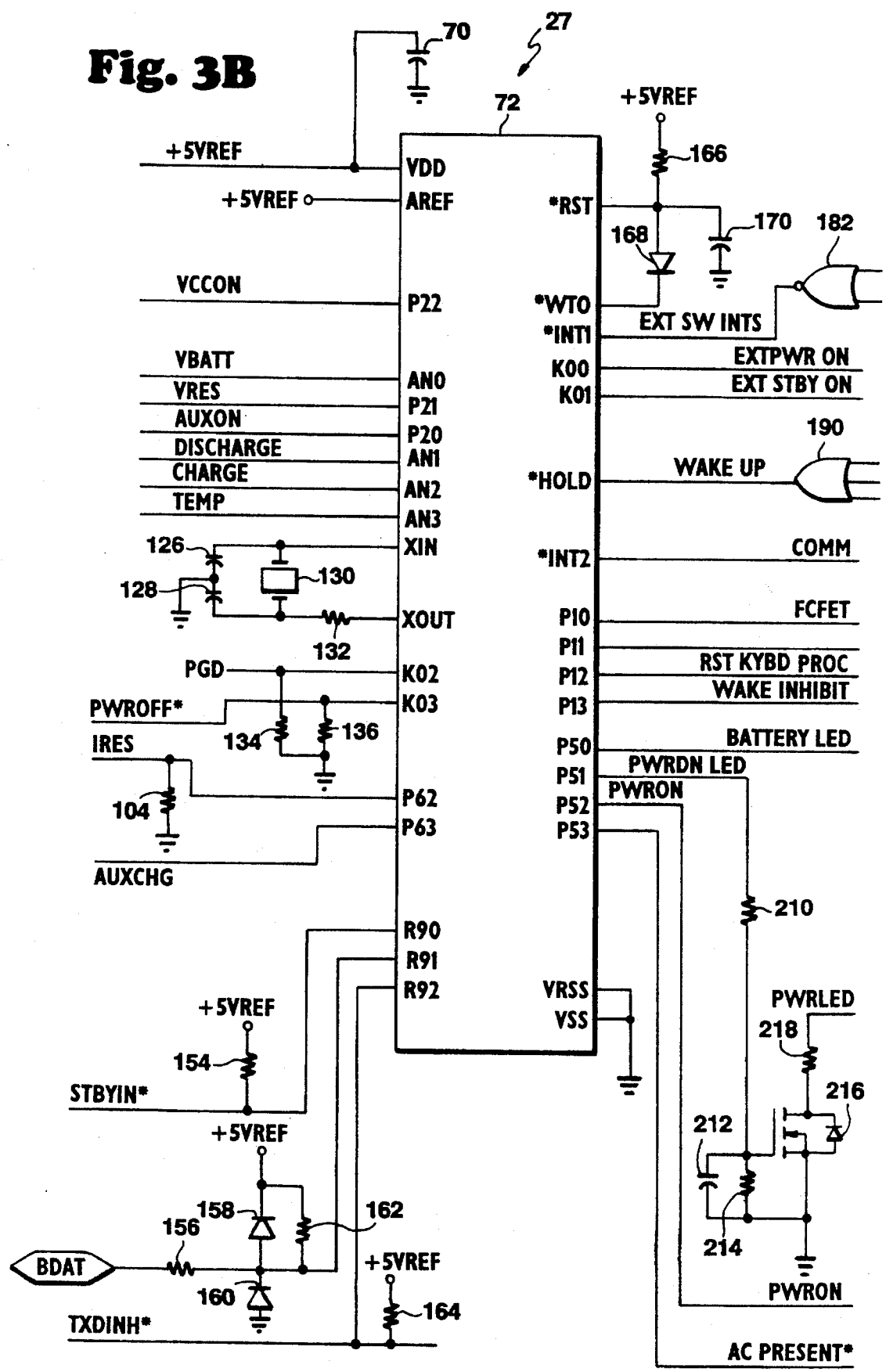
Figure 3C:
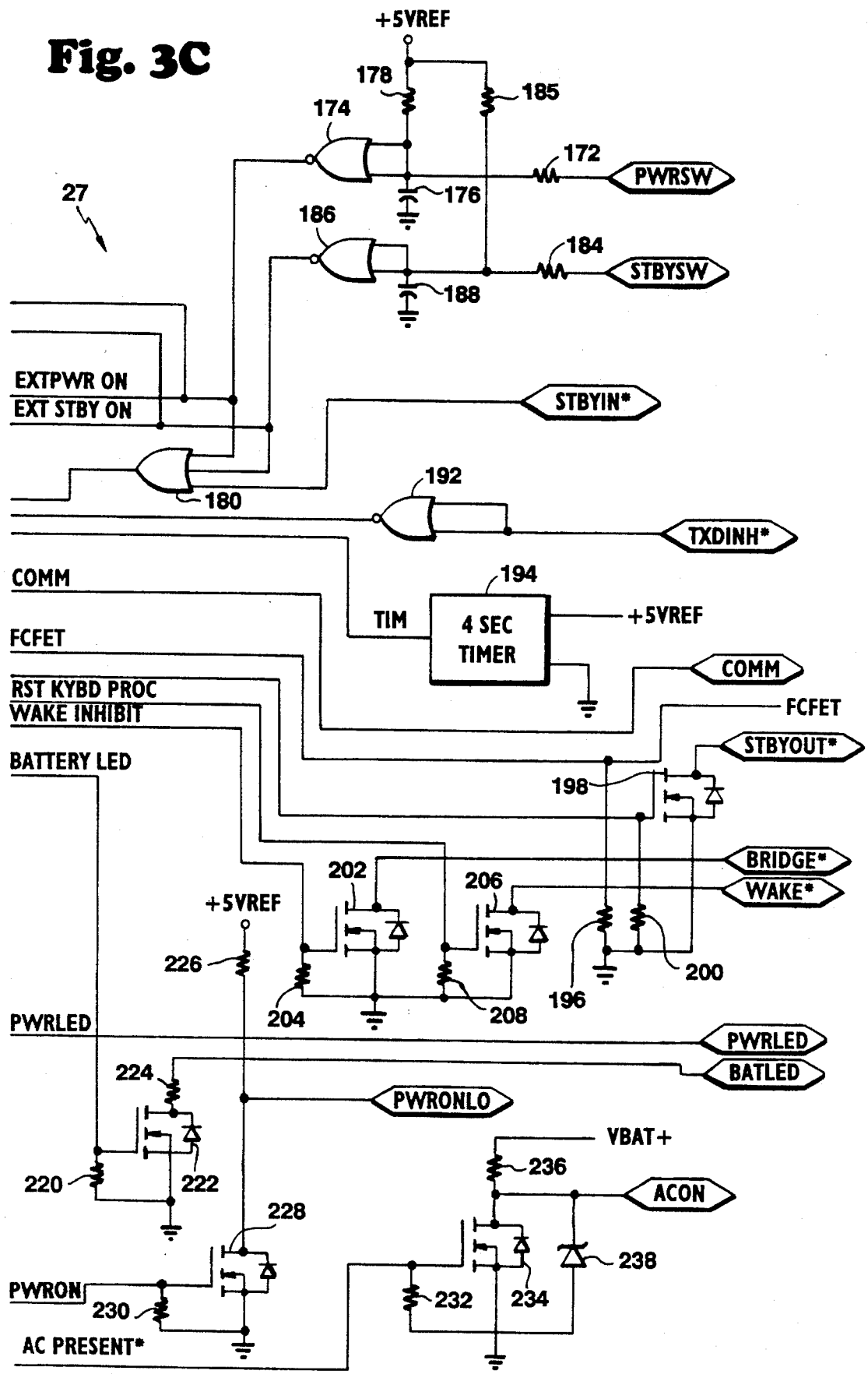
Figure 4A:
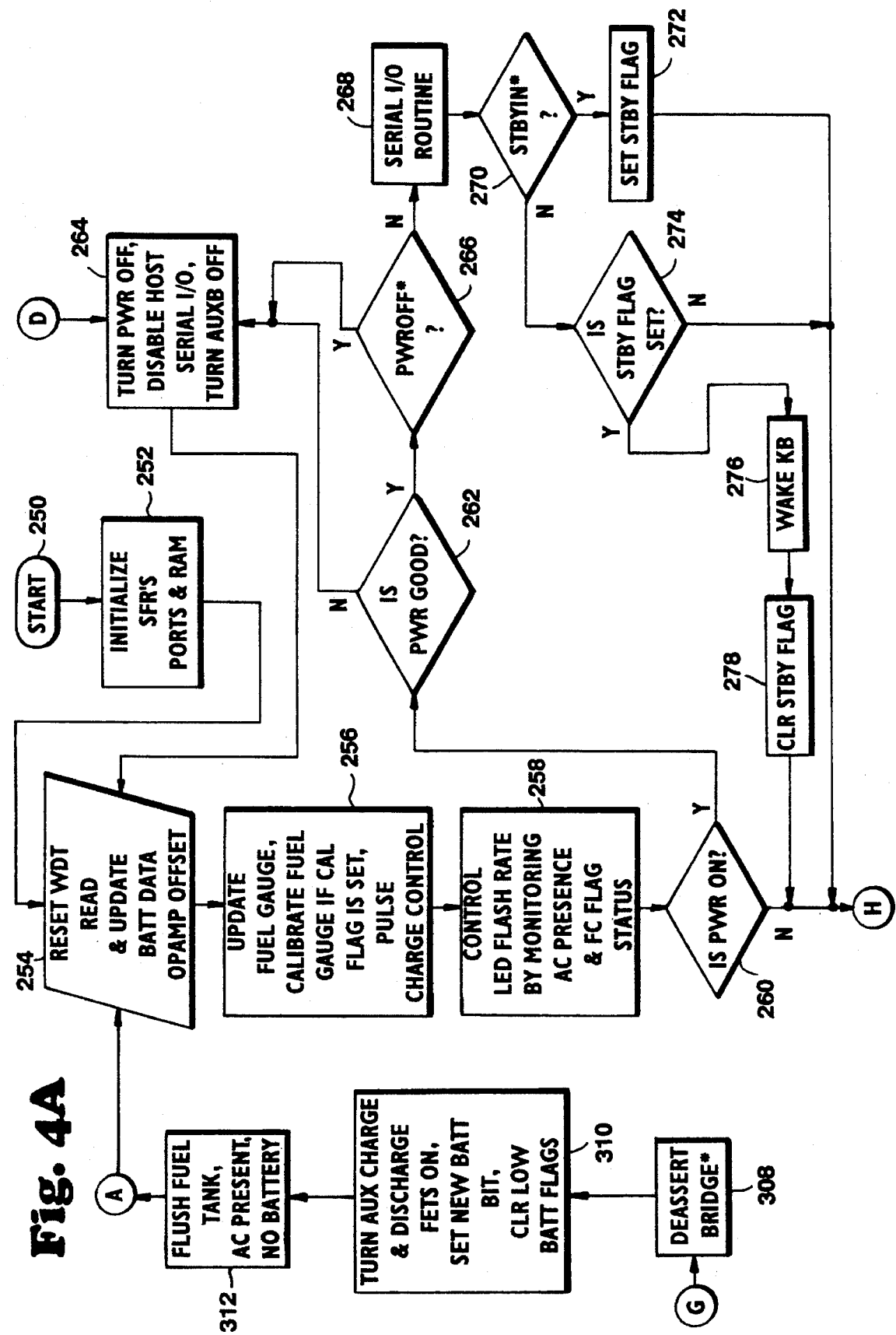
FIGS. 4A–4H are flowchart diagrams illustrating the operation of firmware executed by the microcontroller of FIG. 3.
Figure 4B:
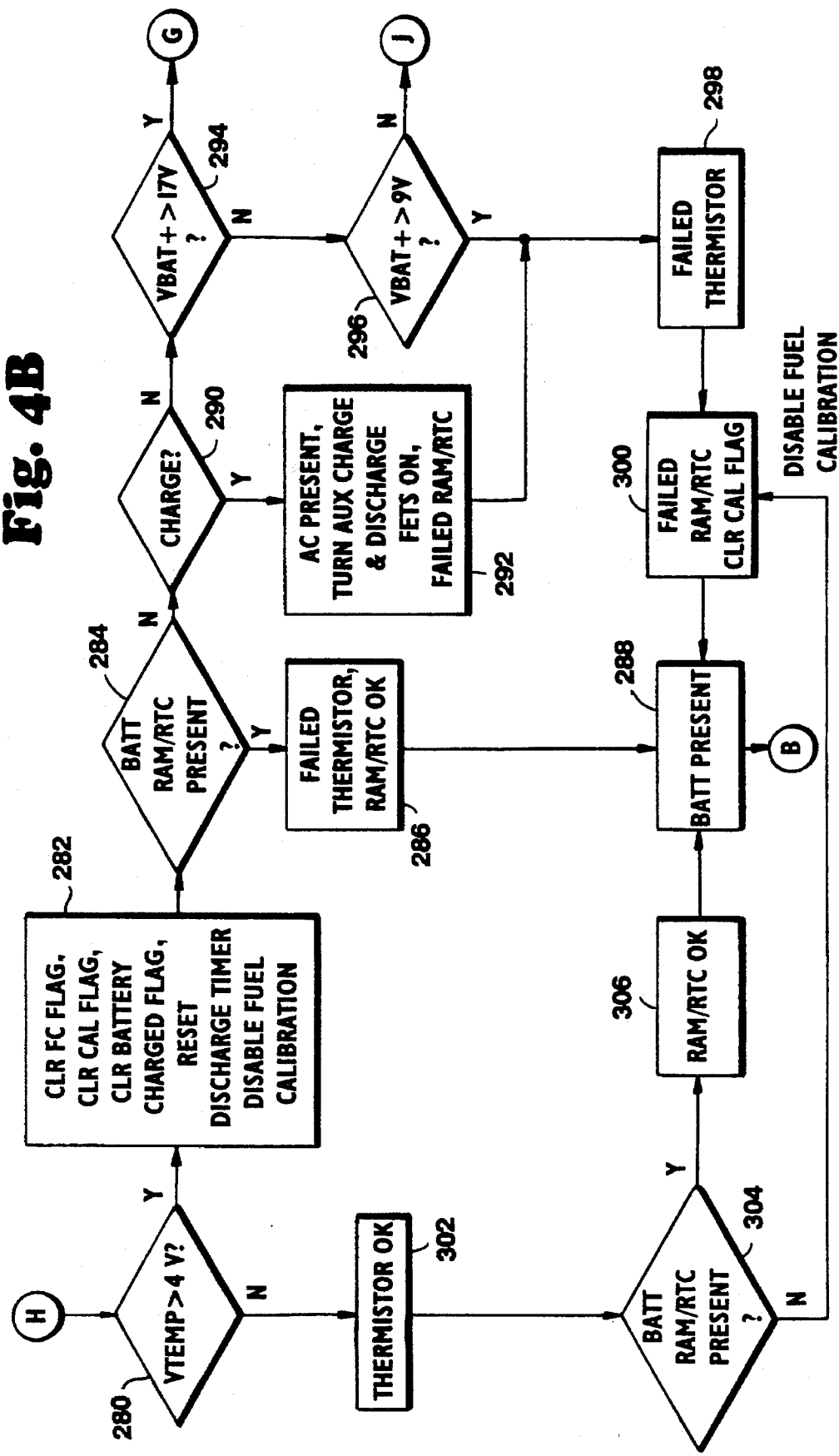
Figure 4C:
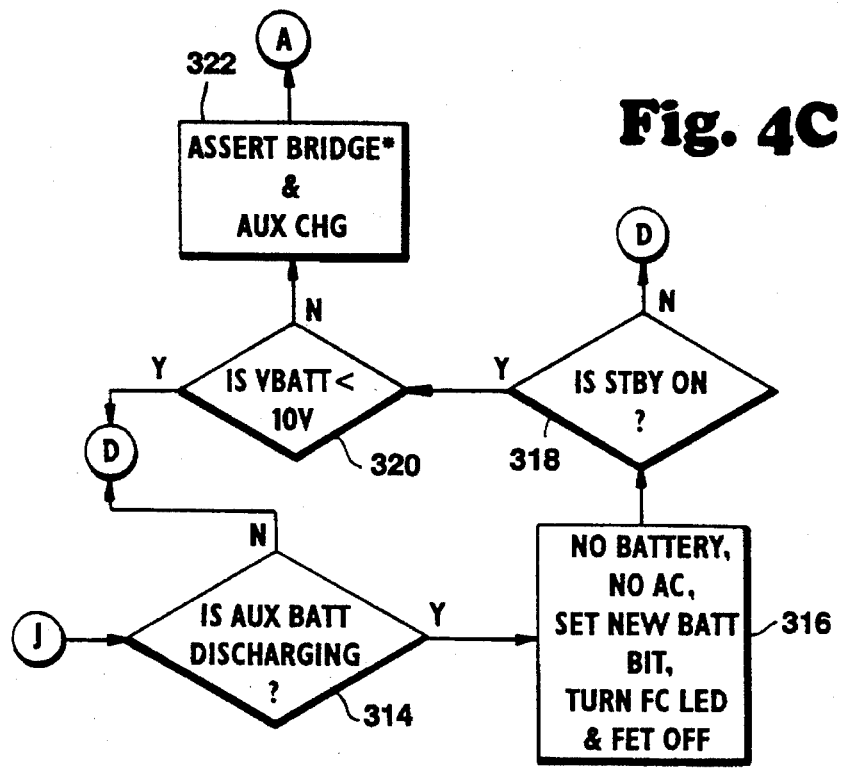
Figure 4E:
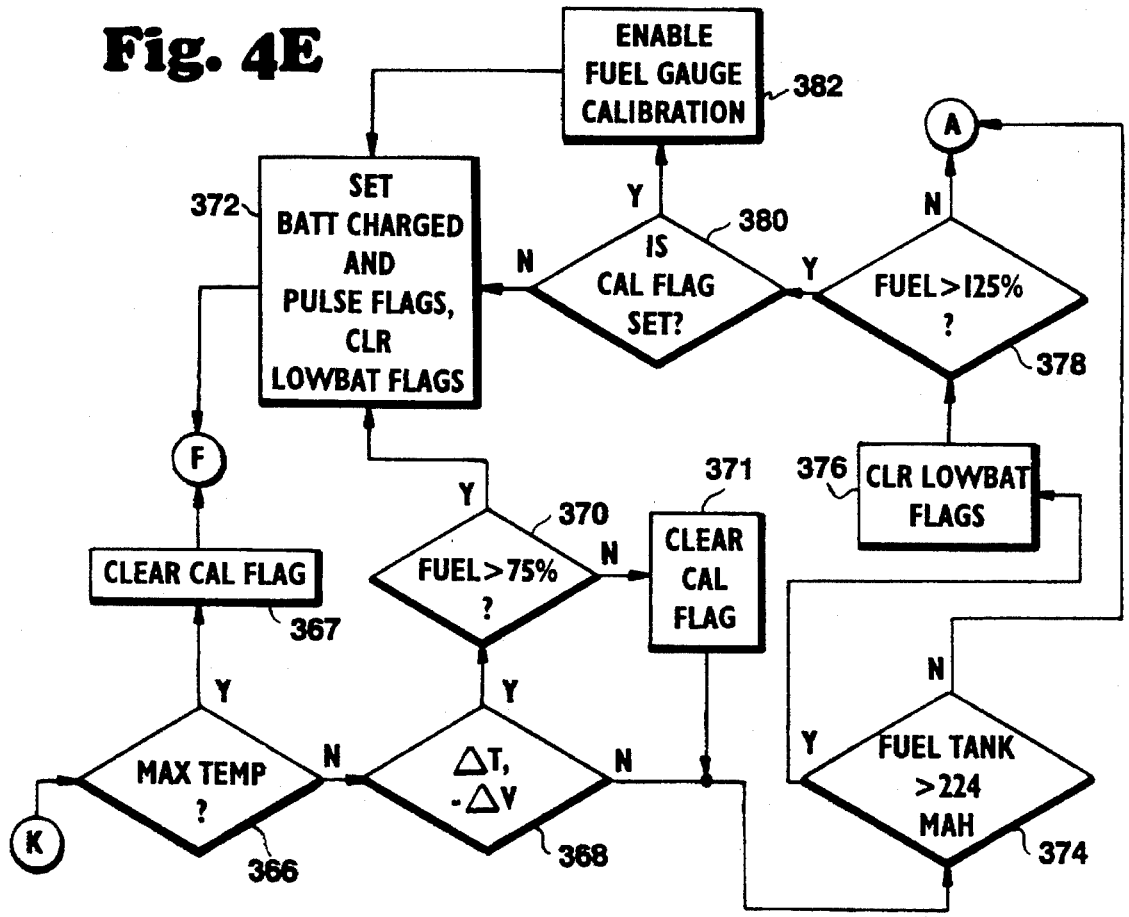
Figure 4D:
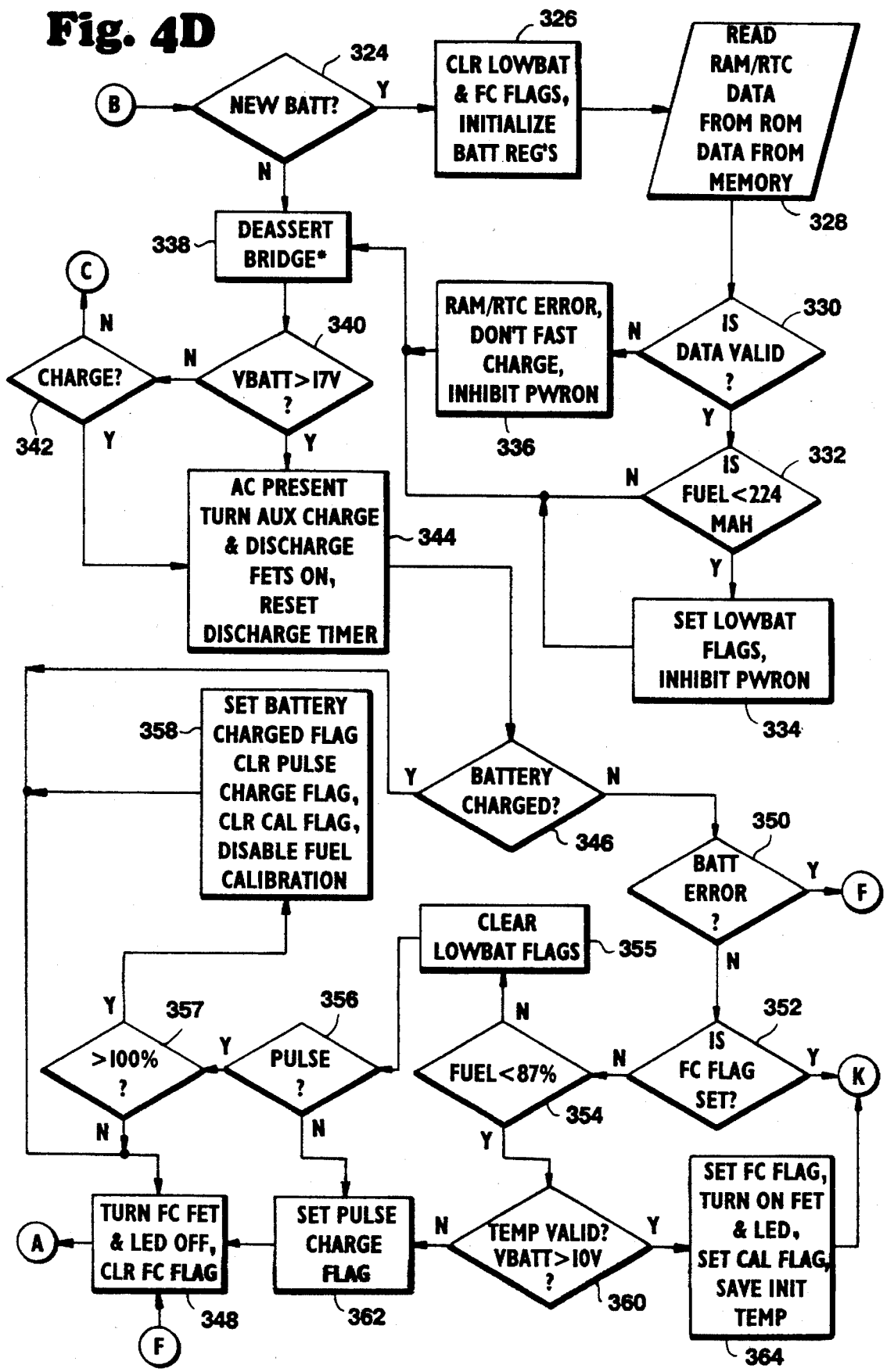
Figure 4F:
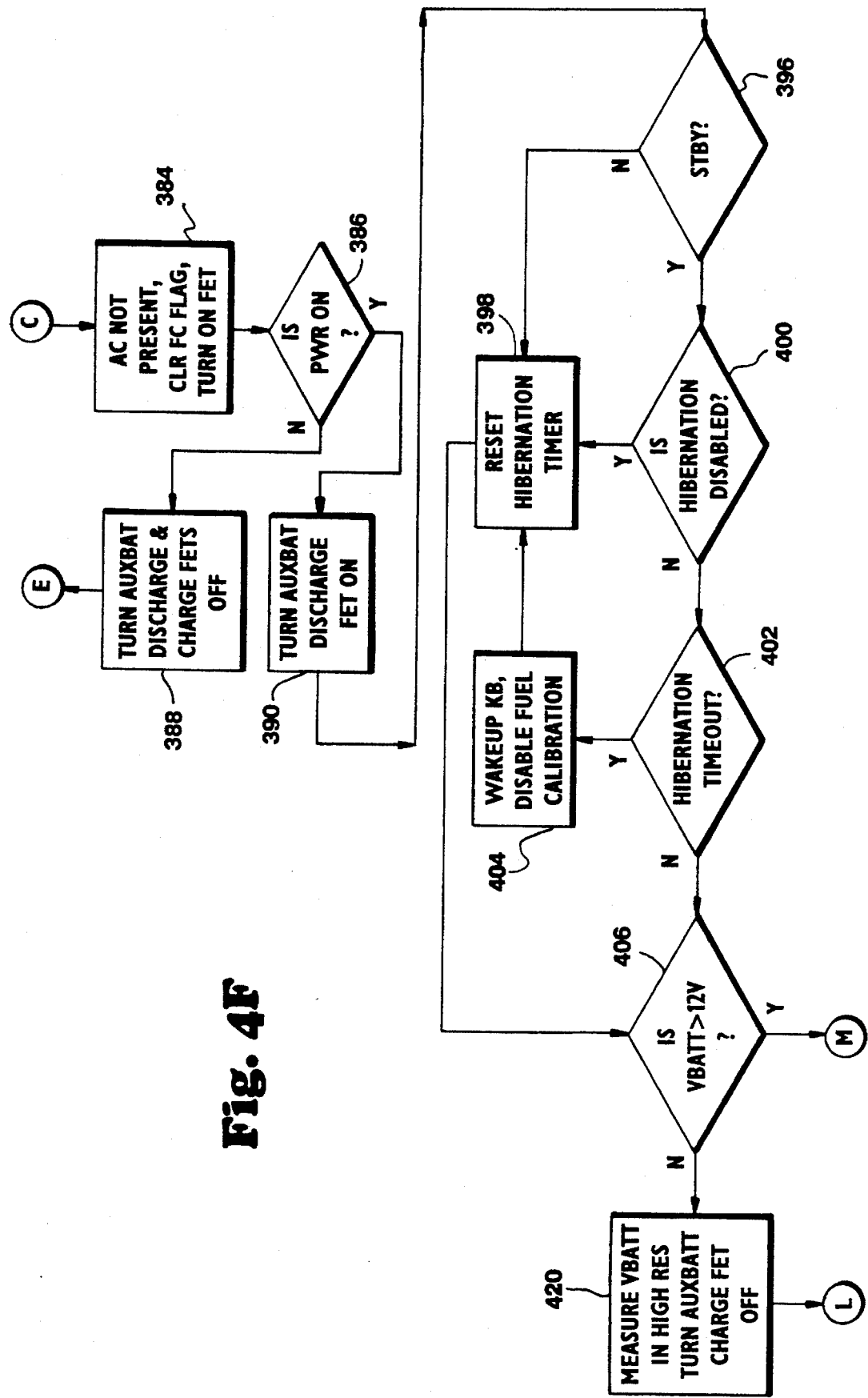
Figure 4G:
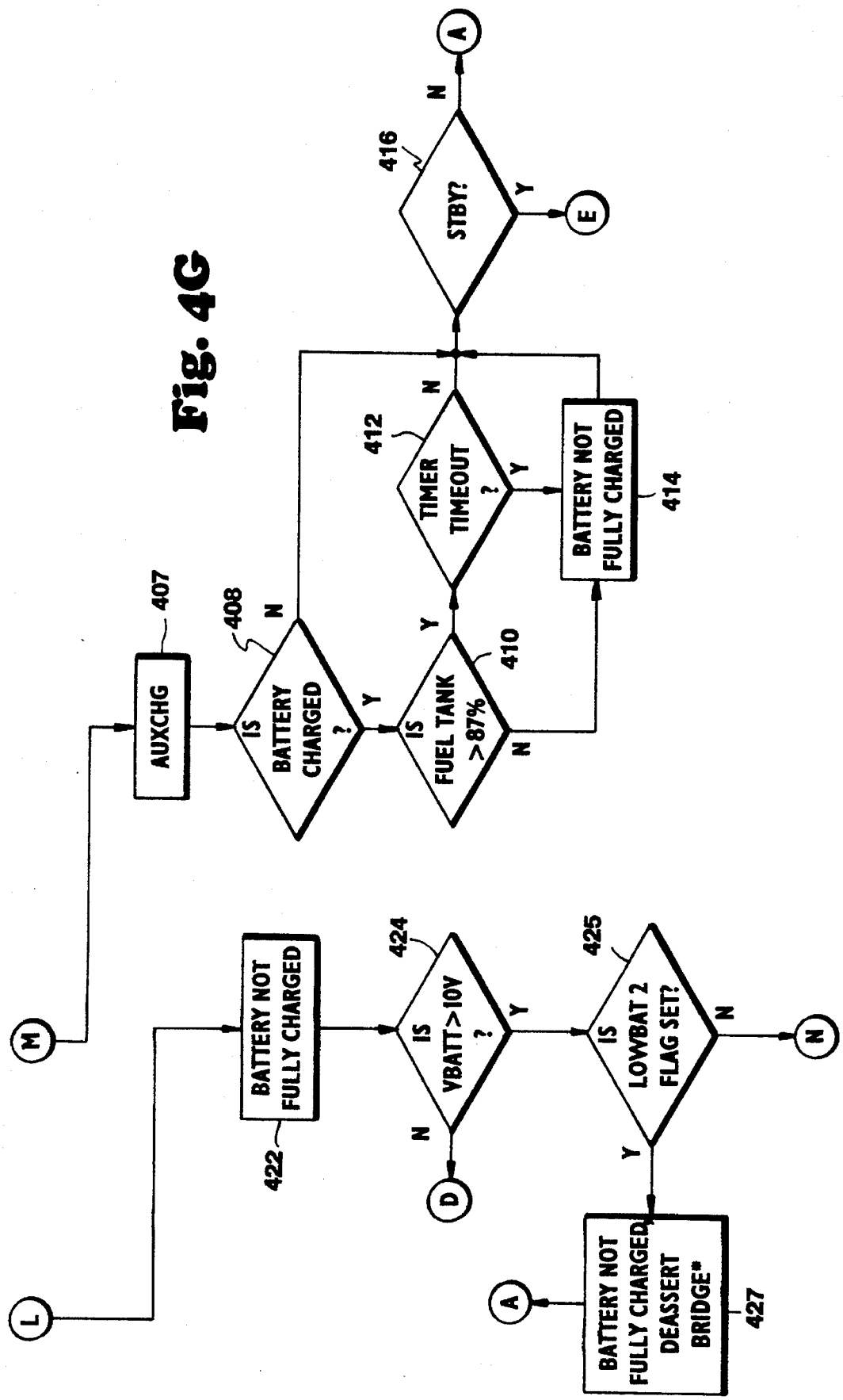
Figure 4H:
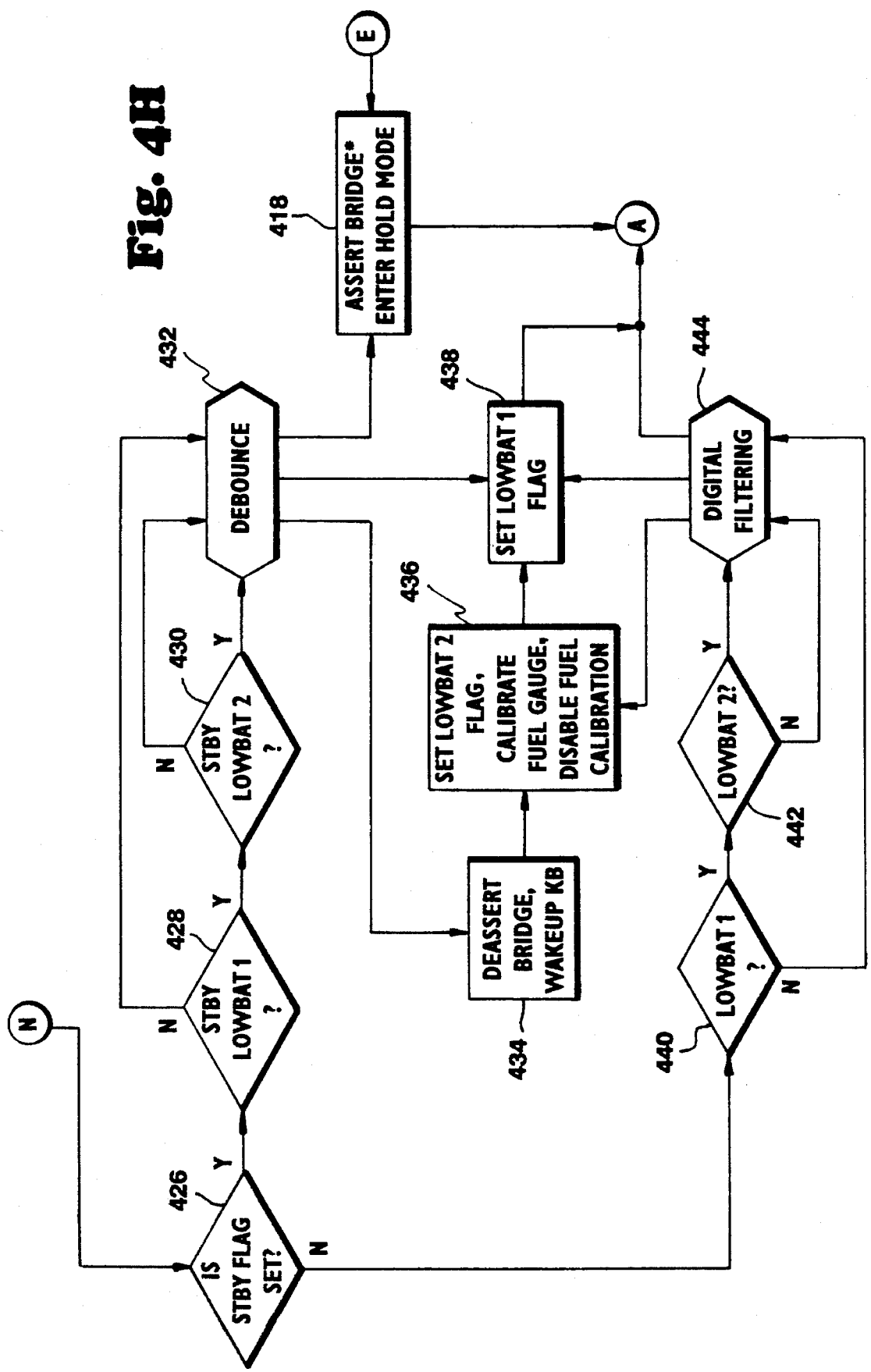

Referring now to FIGS. 3A–3C, a partial block and schematic diagram is shown of the DC—DC controller 27. The VBAT+ signal is connected to one side of a filter capacitor 60 and to the input pin of a precision voltage regulator 62, which is preferably an LP2951 manufactured by National Semiconductor. The other side of the capacitor 60 is coupled to ground. The output pin of the voltage regulator 62 provides a relatively accurate 5 volt reference signal referred to as +5 VREF, which is coupled to one side of a filter capacitor 64 and to its sense input pin. The other side of the capacitor 64 is connected to ground. The voltage regulator 62 has its 5 VTAP and FB (feedback) pins connected together. The +5 VREF signal is provided to the VDD input of the microcontroller 72, which is preferably a TMP47C441 CMOS 4-bit microcontroller manufactured by the Toshiba Corporation. The microcontroller 72 includes an 8-bit analog to digital (A/D) converter, a 4 kbyte ROM, a 128-byte RAM and three internal timers, referred to as TIMER1, TIMER2 and the interval timer, respectively. The +5 VREF signal is also connected to an analog reference input pin of the microcontroller 72 referred to as AREF, establishing an analog reference input for the internal A/D converter. The VASS and VSS pins of the microcontroller 72 are connected to ground.

The VBAT– signal is connected to the drain of an N-channel MOSFET 74, to one side of a resistor 78 and to one side of a resistor 80. The drain of the MOSFET 74 has several pins connected together to increase its current capacity. The MOSFET 74 also includes an inherent diode 76 having its anode connected to its source and its cathode connected to its drain. The gate of the MOSFET 74 receives a fast charge signal referred to as FCFET, which signal is asserted high by the microcontroller 72 to allow fast charging or discharging of the battery 28. The resistor 78 has a resistance to allow a maintenance charge through the battery 28 when the battery 28 and the AC adapter A are installed and the MOSFET 74 is turned off, where the maintenance charge is preferably approximately 10 mA.

The other side of the resistor 80 is connected to the anode of a diode 81, and the cathode of the diode 81 is connected to the I1 input of a battery voltage measuring circuit 82. The battery measuring voltage circuit 82 is connected to ground and has an output providing a signal VBATT, which signal is connected to one side of a diode 84 and to a first analog input pin of the microcontroller 72, referred to as AN0. One of the registers of the microcontroller 72 is defined to implement four analog inputs, referred to as AN0, AN1, AN2 and AN3, respectively, each of which are provided to the internal 8-bit A/D converter depending upon which one is desired to be measured. The cathode of the diode 84 is connected to the +5 VREF signal, where the diode 84 protects the microcontroller 72 from excessive voltage of the VBATT signal. The VBAT+ signal is connected to one side of a resistor 90 and to the source of a P-channel MOSFET 86, which has its gate connected to the other side of the resistor 90. The drain of the MOSFET 86 is connected to one side of a resistor 88, which has its other side connected to the I2 input of the battery voltage measuring circuit 82. The gate of the MOSFET 86 is connected to the drain of an N-channel MOSFET 92, which has its source connected to ground and its gate connected to one side of a resistor 94 and to a signal VCCON provided by a P22 output pin of the microcontroller 72. The other side of the resistor 94 is connected to ground. A P21 output pin of the microcontroller 72 provides a signal VRES, which signal is provided to the battery voltage measuring circuit 82.

The battery voltage measuring circuit 82 operates to measure the voltage levels of the VBAT+ and VBAT– signals one at a time through the VBATT signal provided to the microcontroller 72. The voltage across the battery 28 may be calculated by sampling the VBAT+ signal and then the VBAT– signal and subtracting the two values. The microcontroller 72 asserts the VCCON signal high, which turns on the MOSFETs 92 and 86 providing the VBAT+ signal through the resistor 88 to the battery voltage measuring circuit 82. Due to the operation of the measuring circuit 82, the diode 81 is reversed-biased so that the battery voltage measuring circuit 82 provides an analog voltage at the VBATT signal which is proportional to the VBAT+ signal. The microcontroller 72 asserts the VRES signal high for low resolution, where the VBAT+ signal may range from 0 to 20 volts. The VRES signal is asserted low by the microcontroller 72 for higher resolution, where the VBAT+ signal may range from 0 to 12 volts.

The microcontroller 72 asserts the VCCON signal low to turn off the MOSFETs 92 and 86 and forward bias the diode 81. In this manner, the VBAT− signal is provided through the resistor 80 and the diode 81 to the I1 input of the battery voltage measuring circuit 82, which asserts a proportional voltage at the VBATT signal proportional to the VBAT− signal. The VRES signal is asserted to implement low or high resolution as described previously. The A/D converter of the microcontroller 72 thus develops two 8-bit digital numbers corresponding to the VBAT+ and VBAT− signals.

The source of the MOSFET 74 is connected to one side of a sense resistor 96 and to the input of a discharge current measuring circuit 98, where the other side of the resistor 96 is connected to ground. The discharge current measuring circuit 98 is also connected to ground and samples the voltage across the resistor 96, where this voltage has a level proportional to the current through the battery 28. The discharge current measuring circuit 98 has an output coupled to one side of a resistor 100, which has its other side connected to a signal DISCHARGE, so that the DISCHARGE signal has a voltage level proportional to the discharge current through the battery 28. The DISCHARGE signal is provided to the AN1 analog input of the microcontroller 72, so that the microcontroller 72 may sample the discharge current through the battery 28. The DISCHARGE signal is also connected to the anode of a diode 102, which has its cathode connected to the +5 VREF signal. The diode 102 and the resistor 100 provide voltage and current protection for the microcontroller 72 in case of an excessive voltage level of the DISCHARGE signal.

The microcontroller 72 asserts a signal IRES at an output pin P62, which is provided to one side of a resistor 104 and to the discharge current measuring circuit 98. The other side of the resistor 104 is connected to ground and serves as a pulldown resistor. The microcontroller 72 asserts the IRES signal high to implement high resolution to measure the discharge current through the battery 28, which may preferably range between 0 and 460 mA. The microcontroller 72 asserts the IRES signal low for low resolution, where the discharge current through the battery 28 may preferably range from 0 to 3.677 amperes.

The source of the MOSFET 74 is connected to the I1 input of a charge current measuring circuit 108, which has its I2 input pin connected to ground. The charge current measuring circuit 108 provides an output to one side of a resistor 112. The other side of the resistor 112 is connected to a signal CHARGE, which is also connected to the anode of a diode 114 and to the AN2 input pin of the microcontroller 72. The cathode of the diode 114 is connected to the +5 VREF signal. The diode 114 protects the microcontroller 72 from excessive voltage levels of the CHARGE signal. The charge current measuring circuit 108 measures the voltage across the resistor 96 and asserts a voltage signal at its output so that the CHARGE signal has a voltage proportional to the amount of charging current through the battery 28. The range of the charge current measurements is preferably from 0 to 3.677 amperes. It is noted that while the details of the discharge current measuring circuit 98 and the charge current measuring circuit 108 are not shown, these functions may be performed using circuits well known to those skilled in the art of electronic circuit design. Further, the currents measured are not used to control a feedback loop as in typical when controlling the trickle charge current through the battery 28.

The T+ signal is provided to one side of a pull-up resistor 116, to one side of a filter capacitor 118 to one side of a resistor 120, where the other side of the resistor 116 is connected to the +5 VREF signal, the other side of the capacitor 118 is connected to ground and the other side of the resistor 120 provides a signal TEMP. The TEMP signal is connected to the anode of a diode 122, to the cathode of a diode 124 and to the AN3 analog input of the microcontroller 72. The cathode of the diode 122 is connected to the +5 VREF signal and the anode of the diode 124 is connected to ground. The T− signal is connected to ground when the battery pack B is installed in the computer system C. The resistance of the resistor 116 is preferably approximately 20 kΩ to establish a voltage divider comprising the resistor 116 and the temperature sensor TS, so that the signal TEMP has a voltage proportional to the temperature of the battery 28. The A/D converter microcontroller 72 converts the voltage of the TEMP signal to a digital number to measure the temperature of the battery 28.

The microcontroller 72 includes an XIN pin and an XOUT pin which are used for connecting to an external oscillator circuit to establish a clock frequency for the microcontroller 72. The XOUT pin is connected to one side of a resistor 132, which has its other side connected to one side of a capacitor 128 and to one side of a crystal oscillator 130, which preferably has a frequency of oscillation of approximately 2.45 MHz. The XIN pin of the microcontroller 72 is connected to the other side of the crystal 130 and to one side of another capacitor 126, which has its other side connected to ground. The other side of the capacitor 128 is also connected to ground. In this manner, the oscillator 130, the resistor 132 and the capacitors 126 and 128 establish an operating frequency for the microcontroller 72 of approximately 2.45 MHz.

The PGD signal is connected to a K02 input pin of the microcontroller 72 and also to one side of a resistor 134. The other side of the resistor 134 is connected to ground and serves as a pulldown resistor. The PWROFF* signal is connected a K03 input pin of the microcontroller 72 and to one side of a pulldown resistor 136. The other side of the resistor 136 is connected to ground. In this manner, the microcontroller 72 detects the assertion of the PGD signal and the negation of the PWROFF* signal, which signals are otherwise pulled low.

The AUX+ signal is connected to the source of a P-channel MOSFET 138 and to one side of a resistor 140, which has its other side connected to the gate of the MOSFET 138. The drain of the MOSFET 138 is connected to the VBAT+ signal and its gate is connected to the drain of an N-channel MOSFET 142, which has its source connected to ground and its gate connected to one side of a resistor 144 and to a signal AUXON. The other side of the resistor 144 is connected to ground and the AUXON signal is provided by the P20 pin of the microcontroller 72. The MOSFET 138 includes an internal diode 139 having its anode connected to the drain and its cathode connected to the source of the MOSFET 138, where the diode 139 allows the auxiliary battery 22 to be charged even if the MOSFET 138 is off. The MOSFET 138 serves as a discharge MOSFET for the auxiliary battery 22, where the auxiliary battery 22 may only be discharged if the MOSFET 138 is turned on. The resistor 144 serves to pull the AUXON signal low thereby turning off the MOSFET 142 preventing discharge. When the microcontroller asserts the AUXON signal high, the MOSFET 142 is turned on, essentially connecting the positive terminal of the auxiliary battery 22 to the VBAT+ signal, thus allowing discharge.

The AUX– signal is connected to one side of a filter capacitor 146, to one side of a resistor 150 and to the cathode of a Schottky diode 148. The other side of the capacitor 146 and the anode of the diode 148 are connected to ground and the other side of the resistor 150 is connected to the drain of an N-channel MOSFET 152. The source of the MOSFET 152 is connected to ground and its gate is connected to an auxiliary charge signal, referred to as AUXCHG, which is provided to the P63 input pin of the microcontroller 72. The MOSFET 152 includes an internal diode 153 having its anode connected to the drain and its cathode connected to the source of the MOSFET 152, where the diode 153 allows the auxiliary battery 22 to be discharged even if the MOSFET 152 is turned off. The diode 148 also serves this purpose but has a lower forward drop to conserve energy. The MOSFET 152 serves as a charge MOSFET for the auxiliary battery 22, so that the auxiliary battery 22 can only be charged when the MOSFET 152 is turned on. The microcontroller 72 controls the MOSFET 152 by negating the AUXCHG signal to turn the MOSFET 152 off and by asserting the AUXCHG signal high to turn the MOSFET 152 on.

The STBYIN* signal is connected to one side of a pull-up resistor 154 and to the R90 input pin of the microcontroller 72. The other side of the resistor 154 is connected to the +5 VREF signal. The BDAT signal is connected to one side of a resistor 156, which has its other side connected to an R91 input pin of the microcontroller 72, the anode of a diode 158, the cathode of a diode 160 and one side of a pull-up resistor 162. The cathode of the diode 158 and the other side of the resistor 162 are connected to the +5 VREF signal, and the anode of the diode 160 is connected to ground. The diodes 158 and 160 are provided to prevent overvoltage swings of the BDAT signal from harming the microcontroller 72. The TXDINH* signal is connected to an R92 input pin of the microcontroller 72 and also to one side of a pull-up resistor 164, which has its other side connected to the +5 VREF signal.

The microcontroller 72 includes an *RST pin, which is connected to one side of a pull-up resistor 166, to one side of a reset capacitor 170 and to the anode of a diode 168. An asterisk preceding a device pin name indicates that the device expects negative logic. The other side of the resistor 166 is connected to the +5 VREF signal and the other side of the capacitor 170 is connected to ground. The cathode of the diode 168 is connected to an output pin *WTO of the microcontroller 72. The resistor 166 normally pulls up the *RST pin high, whereas assertion of the *RST pin low resets the microcontroller 72. An internal watchdog timer of the microcontroller 72 asserts the WTO output pin low upon timeout, which pulls the *RST pin low through the diode 168 to reset the microcontroller 72.

The PWRSW signal is connected to one side of a resistor 172, which has its other side connected to one side of a filter capacitor 176, to both inputs of a two-input NOR gate 174 and to one side of a pull-up resistor 178. The other side of the resistor 178 is connected to the +5 VREF signal and the other side of the capacitor 176 is connected to ground. The output of the NOR gate 174 provides a signal EXT PWR ON, which is connected to one input of a two-input NOR gate 182, to one input of a three-input OR gate 180 and to a K00 input pin of the microcontroller 72. The output of the NOR gate 182 provides a signal EXT SW INTS to an *INT1 input pin of the microcontroller 72.

The STBYSW signal is provided to one side of a resistor 184, where the other side of the resistor 184 is connected to one side of a pull-up resistor 185, to one side of a capacitor 188 and to both inputs of a two-input NOR gate 186. The other side of the capacitor 188 is connected to ground and the other side of the resistor 185 is connected to the +5 VREF signal. The output of the NOR gate 186 provides a signal EXT STBY ON, which is connected to the other input of the NOR gate 182, to the second input of the OR gate 180 and to a K01 input pin of the microcontroller 72.

The STBYIN* signal is provided to the third input of the OR gate 180. The output of the OR gate 180 is connected to one input of a three-input OR gate 190. The TXDINH* signal is connected to both inputs of a two-input NOR gate 192, which has its output connected to the second input of the OR gate 190. The +5 VREF signal is connected to a four-second timer 194, which is connected to ground and provides a signal TIM to the third input of the OR gate 190. The output of the OR gate 190 provides a signal WAKE UP, which signal is provided to a *HOLD input pin of the microcontroller 72.

In this manner, if the PWRSW signal is pulsed low by pressing the power switch 26, the EXT PWR ON signal is asserted high and the EXT SW INTS signal is asserted low, which is detected by the microcontroller 72 at the K00 and *INT1 input pins, respectively. Furthermore, the WAKE UP signal is asserted high, which asserts the *HOLD input pin of the microcontroller 72 high, thereby pulling the microcontroller 72 out of standby mode if it is in standby mode. In a similar manner, when the STBYSW signal is pulsed low by pressing the standby switch 23, the EXT STBY ON signal is asserted high as detected by the microcontroller 72 at the K01 input pin, and the EXT SW INTS signal is asserted low. Furthermore, the WAKE UP signal is asserted high as detected by the microcontroller 72 at the *HOLD pin. If the STBYIN* signal is negated high or if the TXDINH1* signal is asserted low, the WAKE UP signal is also asserted high. The four-second timer 194 generates a relatively short pulse approximately every 3.4 seconds on the TIM signal. The pulse on the TIM signal wakes up the microcontroller 72 if it is in standby mode, but otherwise has no effect. Each time this occurs during standby mode, a hibernation counter simulating a hibernation timer is decremented. The initial value of the hibernation timer is provided from the host computer 20 in the form of the maximum time limit to allow the computer system C to remain in standby mode. The hibernation mode may be disabled. If not disabled and the hibernation timeout occurs, the microcontroller 72 sets a hibernation bit referred to as HIBER.

The COMM signal is provided directly to an *INT2 interrupt pin of the microcontroller 72. The microcontroller 72 asserts the FCFET signal at an output pin P10, which is connected to one side of a pulldown resistor 196. The other side of the resistor 196 is connected to ground. The FCFET signal is normally low but is asserted high to activate the MOSFET 74 to either fast charge, pulse charge or discharge the battery 28.

A P11 output pin of the microcontroller 72 is connected to the gate of an N-channel MOSFET 198 and to one side of a pulldown resistor 200, where the source of the MOSFET 198 and the other side of the resistor 200 are connected to ground. The drain of the MOSFET 198 provides the STBYOUT* signal.

A P13 output pin of the microcontroller 72 provides a signal WAKE INHIBIT, which signal is connected to the gate of an N-channel MOSFET 202 and to one side of a pulldown resistor 204, where the other side of the resistor 204 and the source of the MOSFET 202 are connected to ground. The drain of the MOSFET 202 provides the BRIDGE* signal.

A P12 output pin of the microcontroller 72 provides a signal RST KYBD PROC, which signal is provided to the gate of an N-channel MOSFET 206 and to one side of a resistor 208. The other side of the resistor 208 and the source of the MOSFET 206 are connected to ground, where the drain of the MOSFET 206 provides the WAKE* signal.

A P50 output pin of the microcontroller 72 provides a signal BATTERY LED which is connected to the gate of an N-channel MOSFET 222 and to one side of a pulldown resistor 220. The other side of the resistor 220 and the source of the MOSFET 222 are connected to ground. The drain of the MOSFET 222 is connected to one side of a resistor 224 and the other side of the resistor 224 provides the BATLED signal.

A P51 output pin of the microcontroller 72 provides a signal PWRON LED which is provided to one side of a resistor 210. The other side of the resistor 210 is connected to the gate of an N-channel MOSFET 216, to one side of a resistor 214 and to one side of a filter capacitor 212. The other side of the capacitor 212, the other side of the resistor 214 and the source of the MOSFET 216 are connected to ground. The drain of the MOSFET 216 is provided to one side of a resistor 218 and the other side of the resistor 218 provides the PWRLED signal.

A P52 output pin of the microcontroller 72 provides a signal PWRON which is provided to the gate of an N-channel MOSFET 228 and to one side of a resistor 230. The other side of the resistor 230 and the source of the MOSFET 228 are connected to ground. The drain of the MOSFET 228 provides the PWRONLO signal, which is also connected to one side of a pull-up resistor 226, which has its other side connected to the +5 VREF signal.

An output pin P53 of the microcontroller 72 provides a signal AC PRESENT, which is connected to the gate of an N-channel MOSFET 234 and to one side of a resistor 232. The other side of the resistor 232 and the source of the MOSFET 234 are connected to ground, where the drain of the MOSFET 234 provides the ACON signal. A 14-volt Zener diode 238 has its anode connected to ground and its cathode connected to the ACON signal. Also, the ACON signal is connected to one side of a pull-up resistor 236, which has its other side connected to the VBAT+ signal. In this manner, the ACON signal is normally pulled high through the resistor 236 limited to 14 volts as determined by the Zener diode 238. When the AC PRESENT, signal is asserted low by the microcontroller 72, the ACON signal is asserted high, turning on the AC MOSFET 31.

FIGS. 4A–4H are flowchart diagrams illustrating the operation of firmware being executed by the microcontroller 72 of FIG. 3. The flowchart diagrams represent a preferred method of practicing the present invention but is not the exclusive method as many variations are possible. Also, many timing details are not explicit in the flowchart diagrams but are explained in more detail in the following text.

Referring now to FIGS. 4A–4H, operation begins at power-up of the microcontroller 72 at step 250 which is the starting or beginning point of the firmware. Off page connectors are used in FIGS. 4A–4H to continue flow of operation from one Figure to another. Operation proceeds to an initialization step 252 where variables and constants are defined, flags are cleared, I/O ports and registers are defined, local RAM contents are cleared, local ROM contents are read and many other housekeeping details are handled to generally define the initial state of the DC—DC controller 27. A flag UPDATE is set to indicate time to read the ROM contents of the RAM/RTC 40, which will occur if the battery pack B is present. The conditions to check the status of the UPDATE flag and to determine if the battery pack B is present are described below. The UPDATE flag is set upon power-up and if a new battery pack B is installed in a system while operating.

Operation proceeds to step 254 which begins the main loop of the firmware. In step 254, an internal watchdog timer is reset, where the watchdog timer is a failsafe mechanism which should not timeout during normal operation. If the watchdog timer does timeout, the microcontroller 72 asserts the *WTO pin low to reset the microcontroller 72. Also in step 254, data from the battery 28 is read and related flags are set if an A/D converter enable flag ADEN has been previously set. Upon the first execution of step 254, the ADEN flag is not set so that the battery data is not read since it has not yet been determined whether the battery 28 is installed. If the ADEN flag is set, the data is read and the ADEN flag is cleared. The battery data includes the voltage, the charge or discharge current and the temperature of the battery 28 as derived from the VBATT, DISCHARGE, CHARGE and TEMP signals received at the AN0–AN3 input pins, respectively. The microcontroller 72 asserts the VCCON, VRES and IRES signals at appropriate times to retrieve the proper data. The microcontroller 72 stores these data values in its local RAM. If the data is read, the data is checked for validity where each value is compared to valid ranges. If all of the data is valid, a WRVALID flag is set but remains cleared otherwise.

It is noted that the TIMER1 timer is used to generate real time delays for the watchdog timer reset rate, A/D sampling rate, serial data output rate to the host computer 20 as well as a pulse trickle charge rate, described below. The TIMER1 timer generates an interrupt to the microcontroller 72 approximately once every 106.7 milliseconds (ms) to decrement counters used for each of the above-listed functions, where 106.7 ms corresponds to a frequency of approximately 9.375 Hz. When a counter reaches zero, a corresponding flag is set so that the corresponding function is executed in the main loop. The watchdog timer overflow time period is approximately 856 ms, but should be reset by the TIMER1 timer every 106.7 ms during normal operation. The A/D sampling rate is preferably approximately 0.8533 seconds or 8 times the TIMER1 timer interrupt period, where the ADEN flag is set to indicate A/D samples are to be taken. The serial data rate is approximately once every 12 seconds if the AC adapter A is the primary power source, but is increased to once every 5 seconds if the battery 28 is the primary power source.

The microcontroller 72 also determines whether the RAM/RTC 40 is present in step 254. To do this, the microcontroller 72 asserts the BDAT signal low for preferably approximately 575 microseconds and then negates the BDAT signal high. After the BDAT signal goes high, if the RAM/RTC 40 is present and operating correctly, it responds within approximately 15–60 microseconds by also asserting the BDAT signal low for preferably approximately 60–120 microseconds. If the RAM/RTC 40 is not present, the BDAT signal remains high for a minimum of 480 microseconds. If the RAM/RTC 40 is present, a flag referred to as RAMPRS is set. Also, the data retrieved from the CHARGE and DISCHARGE signals is monitored to determine if the battery 28 is being charged or discharged. If charging, a flag referred to as CHRGER is set and is cleared if discharging.

From step 254, operation proceeds to step 256 where the battery fuel gauge numerator is updated if a flag referred to as BATTIN is set indicating that the battery 28 is present. The numerator and the denominator are represented as digital numbers having 3 bytes of resolution each in the microcontroller 72. If the BATTIN flag is not set, which it will not be on the initial execution of step 256, operation proceeds to step 258. If the battery 28 is present in step 256, the CHRGER flag is sampled to determine whether the battery 28 is being charged or discharged. If the battery 28 is being charged, a flag referred to as ACFLAG is set and the ACON signal is asserted high turning on the AC MOSFET 31, since the AC adapter A is present if the battery 28 is charging.

The fuel gauge measurements are performed by continuing to sample the current through the battery 28 at a fixed time interval, where this time interval is the A/D sampling rate of 0.8533 seconds. By multiplying the current of the battery 28 by the given time interval, the product is the number of coulombs that has been charged to or discharged from the battery 28. Since the 8-bit A/D converter has 255 steps of resolution and the range of the battery current is from 0–3.677 amps, one A/D step represents approximately 14.42 mA.

In the preferred embodiment, it is easier to represent each A/D step in units of coulombs rather than units of current for the microcontroller 72, where each A/D step in units of coulombs is referred to as a TOFU unit. In this manner, one TOFU unit is equal to 0.8533 seconds×14.42 mA or 3.418 µAh. The fuel gauge numerator and the denominator are both measured in TOFU units. Since the number of TOFU units is equal to the number of A/D steps converted from the current measurement, the A/D data can be directly added to or subtracted from the fuel gauge numerator, depending upon whether the battery 28 is being charged or discharged as determined from the CHRGER flag. If the battery 28 is fully charged, as determined by a full charge flag referred to as FCHRG, then the numerator is not increased but is set equal to the denominator representing full charge. If the battery 28 is discharging and the discharge current is less than preferably approximately 230 mA, then the resolution is switched to high by asserting the IRES signal low in order to get a more accurate reading of the discharge current. If the numerator underflows, it is flushed or set equal to 0. If adding to the numerator and it overflows, then the numerator is updated by setting it equal to the denominator.

The run time of the battery 28 can be derived from the fuel gauge numerator and the discharge current data. This of course is only necessary if the battery 28 is being discharged. The fuel gauge numerator is divided by the discharge current and multiplied by 14 mAh/14.42 mA which provides an appropriate number representing the number of hours remaining for battery run time.

In step 256, a flag referred to as CAL and a flag referred to as FUELEN are monitored to determine whether the fuel gauge denominator should be calibrated. The FUELEN flag is used to disable fuel gauge calibration altogether, whereas the CAL flag determines when calibration should occur in a charging cycle. The fuel gauge denominator is adjusted when the battery 28 has been fully charged and fast charge is terminated under normal conditions, and then discharged to when the numerator becomes zero or when the voltage of the battery 28 decreases to the LOWBAT2 set point, or the SLOWBAT2 set point if in standby. If the CAL flag is cleared, fuel gauge calibration is not performed. The CAL flag is cleared, as described below, if the discharge cycle is interrupted by any one of the following abnormal fast charge termination conditions: 1) the battery pack B is removed, 2) the AC power is intermittent, 3) the power of the computer system C is off, or 4) a hibernation timer timeout has occurred. The hibernation timer will be described below.

In step 256, the denominator is increased if the numerator has reached zero before the battery 28 has fully discharged. The number of TOFU units representing the amount of charge removed from the battery 28 is divided by two and added to the denominator for each time interval set by the A/D sampling rate. In this manner, the denominator is incrementally increased while the battery 28 is discharging so that the denominator more accurately reflects the capacity of the battery 28. The division by two assures that the denominator is not updated too quickly. If the LOWBAT2 or SLOWBAT2 set points are reached before the numerator reaches zero and the CAL and FUELEN flags are set, the denominator is decreased in step 436 described below.

In step 256, flags are monitored to determine if pulse trickle charging should be performed, where the MOSFET 74 is pulsed on and off using the FCFET signal at a certain predetermined rate to implement a trickle charge through the battery 28. The BATTIN flag is checked to determine if the battery 28 is present, a flag PULSE is checked to determine if pulse trickle charging is appropriate, the ACFLAG is checked to determine if the AC adapter A is present and a fast charge flag FASTB is checked to determine if the battery 28 is currently being fast charged. Pulse trickle charge is skipped if any of these flags are not set. After a full fast charge cycle, the battery 28 is pulse trickle charged by applying a predetermined duty cycle having a predetermined period for a predetermined time period to maximize the capacity of the battery 28. The TIMER1 timer is preferably used where the FCFET signal is asserted to turn on the MOSFET 74 for a pulse having a duration of 106.7 ms and then negated, turning off the MOSFET 74 for the next 15 consecutive 106.7 ms periods. Thus, the duty cycle is 1/16th or 6.25% of the overall period of 1.7 seconds. The AC adapter A preferably provides approximately 35 watts of power, which is available to charge the battery 28 when the computer system C is powered off. Since the voltage of the battery 28 is approximately 14.5 volts at the end of a fast charge cycle, approximately 2.4 amps are available for trickle charge. This current is reduced to approximately 80 mA when the computer system C is powered on. The average trickle charge current is thus approximately 2.4/16 amps or approximately 150 mA during standby mode or when the computer system C is off, or approximately 0.08/16 amps or 50 mA when the computer system C is powered on. Thus, since the capacity (C) of the battery 28 is approximately 2.2 Ah, pulse trickle charge roughly approximates a charging current rate of C/20 which equals 110 mA, and which is typical for a trickle or topoff charging rate. After pulse trickle charging for preferably approximately 2 hours, the FCFET signal is negated and the battery 28 receives the maintenance charge through the resistor 78.

If a smaller trickle charging rate is desired, the duty cycle may be decreased by increasing the period by integer factors of 1.7 seconds for simplification. For example, if a charge rate of C/40 or 55 mA is desired, the pulse period is multiplied by 2 to equal about 3.4 seconds, so that the average current is approximately 2.4/32 amps or 75 mA during standby or when the computer system C is off, or approximately 0.08/32 amps or 25 mA when the computer system C is on. Of course, the average current is doubled by keeping the MOSFET 74 switched on for two 106.7 ms pulses of the total 3.4 seconds. These examples are for illustration only and not intended to limit the invention, as many combinations are possible to simulate various desired trickle charge rates.

From step 256, operation proceeds to step 258 where the LEDs 24 and 25 are controlled. A power flag referred to as PWRON is checked to determine if the power is on. Also, a standby flag referred to as STBY is checked to determine if the computer system C is in standby. If the computer system C is powered on and not in standby, the PWRLED signal is asserted continually. If the computer system C is in standby, the PWRLED signal is preferably flashed at a 0.2 Hz rate. Again, to achieve the flash frequency, counters and the TIMER1 timer are used to determine when to turn on and turn off the power LED 25. Otherwise, the computer system C is off and the power LED 25 remains off. A flag LWBT1 is set when either the LOWBAT1 or SLOWBAT1 set points are reached, indicating that the battery LED 24 should be flashed at the 1 Hz rate. A flag LWBT2 is set when either the LOWBAT2 or SLOWBAT2 set points are reached, indicating that the battery LED 24 should be flashed at the 2 Hz rate. Thus, these flags are checked and corresponding counters are used to assure the appropriate flash rate.

From step 258 operation proceeds to step 260 where the PWRON flag is monitored to determine if power is on or off. If power is on in step 260, operation proceeds to step 262 where the PGD signal from the DC—DC power circuit 29 is checked to determine if the power is good. If the power is not good, operation proceeds to step 264 where a routine is executed to turn the power off, to disable the host serial I/O communication described below, to negate the FCFET signal to disable charging of the battery 28, and to negate the AUXCHG and AUXON signals to disable the auxiliary battery 22. The STBY flag is also cleared. From step 264, operation returns to step 254 to restart the main loop of the firmware.

If the power is good in step 262, operation proceeds to step 266 where the PWROFF* signal is monitored to determine if the host computer 20 is requesting that the power be shut off. If so, operation proceeds to step 264 to turn the power off. Otherwise, operation proceeds to step 268 where data is loaded to be sent to the host computer 20 if necessary. Before allowing data to be sent, several flags are checked to assure that data is ready to be sent or is being sent at the appropriate time. The WRVALID flag is checked to assure that the data is valid. The PWRON flag is also checked to assure that power is on before data is sent to the host computer 20. A serial I/O out enable flag, referred to as SIOEN, is monitored to determine whether it is time to send data. The SIOEN flag is set by TIMER1 timer when either the 5 or 12 second period has elapsed and it is time to send another set of data. A serial I/O routine on-going flag, referred to as SERON, is set to indicate to the serial I/O port to send another byte of data, once previous transactions are completed. Once a byte is sent, the SERON flag is cleared to indicate preparedness to send another byte. In the preferred embodiment, the COMM signal is used to implement the bi-direction serial communication with the host computer 20 for status reporting and configuration parameters updating. The microcontroller 72 sends serial data on the COMM signal unless the TXDINH* signal is asserted low. If the TXDINH* signal is asserted low, the microcontroller 72 must receive serial data from the COMM signal.

The serial protocol is the standard 10-bit universal asynchronous receiver/transmitter (UART) format with one start, eight data and one stop bit. The preferred frequency is approximately 1,200 BAUD, which is established by the interval timer, which interrupts the main loop to send another bit of the current byte being sent. A set of data comprises six data bytes, including SYNC, SysID#1, SysID#2, battery discharge current, battery fuel gauge numerator and battery fuel gauge denominator. In addition, a delay of 100 milliseconds is inserted after each data byte to allow time for the host computer 20 to process the serial data. In step 268, therefore, the microcontroller 72 loads the next one of the six outgoing data bytes into a serial output data buffer. During each interval timer interrupt, one data bit in the serial output buffer is shifted to and latched onto the COMM signal, until all 8 bits are transmitted. The main routine continues to fetch data to the serial output buffer until all 6 data bytes are transmitted.

The SYNC byte consists of all ones and is the first byte in the serial data packet. The SysID#1 byte immediately follows the SYNC byte and comprises the following data:

| BIT # | NAME | DEFINITION | CONDITION |
| --- | --- | --- | --- |
| 7 (MSB) | FC | Fast Charge | "1" = Battery 28 is fast charging. |
| 6 | Nub | New Battery Pack B | Toggles to "0" for two serial transmissions when a different battery pack B is installed. |
| 5 | AC | Adapter Present | "1" = A/C Adapter A is present and powering the computer system C. |
| 4 | BATT | Battery Present | "1" = Battery 28 is present. |
| 3 | Rfail | RAM/RTC 40 Failure | "1" = RAM/RTC 40 failed. |
| 2 | Thfail | Thermistor Failure | "1" = Temperature Sensor TS failed. |
| 1 | Lbt1 | Low Battery 1 | "1" = LOWBAT1 or SLOWBAT1 set point has been reached. |
| 0 | Lbt2 | Low Battery 2 | "1" = LOWBAT2 or SLOWBAT2 set point has been reached. |

The SysID #2 byte is the third byte in the serial data packet and comprises the following data:

| BIT # | NAME | DEFINITION | CONDITION |
|---|---|---|---|
| MSB 4–7 | Type | Battery Type | "0010" = NMH type battery 28 by Sanyo |
| 3 | Gauge | Valid Fuel Gauge | "1" = Fuel gauge is accurate. |
| 2 | ROMfail | ROM Failure | "1" = Battery Pack B ROM is invalid. |
| 1 | | | Spare |
| 0 | HIBER | Hibernation | "1" = Hibernation timer time-out |

The battery discharge current byte is the fourth byte, where each A/D unit represents 14.42 mA. The fifth byte is the most significant byte of the battery fuel gauge numerator, where each bit represents 14 mAh. The last or sixth byte is the most significant byte of the battery fuel gauge denominator, where each bit also represents 14 mAh. The numerator and denominator are thus converted from TOFU units to units more appropriate for the host computer 20.

From step 268, operation proceeds to step 270 where the STBYIN* signal is monitored to determine if the host computer 20 is requesting standby mode. If so, operation proceeds to step 272 where the STBY flag is set and operation proceeds to step 280 described below. Otherwise, if the STBYIN, signal is not asserted in step 270, operation proceeds to step 274 where the STBY flag is checked to determine if it is set or not. If not, operation proceeds to step 280. If so, operation proceeds to step 276 where the keyboard controller 21 is awakened by the microcontroller 72 by asserting the WAKE, signal low. Operation then proceeds to step 278 where the STBY flag is cleared and then operation proceeds to step 280. Recall that the DC—DC controller 27 detects the standby switch 23 pressed when the STBYSW signal is pulsed low, asserts the STBYOUT* signal to the host computer 20 to request standby and enters standby mode when the STBYIN* signal is detected asserted low. Thus, if the STBYIN* signal is negated high, the STBY flag should be cleared if set.

From either steps 272, 274 or 278, operation proceeds to step 280 where the voltage of the TEMP signal previously read is compared with 4 volts. If the TEMP signal was greater than 4 volts, then the temperature sensor TS is either not present or is not operating properly, and operation proceeds to step 282 where the FASTB flag, the CAL flag, the FCHRG flag and the PULSE flag are all cleared. Also, the FUELEN flag is cleared to disable fuel gauge denominator calibration. The BATLED signal is negated to turn off the battery LED 24. A discharge time counter is reset, where the discharge time counter is incremented by the TIMER1 timer and is used to determine whether the battery 28 has discharged for at least 5 minutes while providing power to the computer system C. If so, fast charging is once again allowed. From step 282, operation proceeds to step 284 where the RAMPRS flag is checked to determine if the RAM/RTC 40 is present. If so, operation proceeds to step 286 where a thermistor fail flag, referred to as TFAIL, is set indicating that the temperature sensor TS is not operating properly. The temperature sensor TS is considered to have failed in step 286 since it was determined in step 280 that the temperature sensor TS was either not present or not working, and it is considered to be present if the RAM/RTC 40 is also present. Operation then proceeds to step 288 from step 286 where the BATTIN flag is set indicating that the battery pack B is present. From step 288, operation proceeds to step 324. Step 324 will be described below.

Referring back to step 284, if the RAM/RTC 40 is not present, operation proceeds to step 290 where the CHRGER flag is checked to determine whether the battery 28 is charging or discharging. If the battery 28 is charging, operation proceeds to step 292 from step 290 where the ACFLAG flag is set indicating that the AC adapter A is present. Also, the ACON signal is asserted to turn on the AC MOSFET 31, the FCFET signal is negated low to turn off the MOSFET 74, the AUXON and AUXCHG signals are both asserted high to enable charging or discharging of the auxiliary battery 22, and the LWBT1 flag is cleared. It is noted that the auxiliary battery 22 is charged when the AC adapter A is installed and powered on regardless of whether the computer system C is on or off or in standby mode. Although the battery 28 is present since charging, it is not fast charged since both the temperature sensor TS and the RAM/RTC 40 have failed. From step 292, operation proceeds to step 298 where the TFAIL flag is set indicating that the temperature sensor TS has failed. Operation then proceeds to step 300 from step 298 where a flag RTCFAIL is set indicating that the RAM/RTC 40 has failed and the CAL flag is cleared. From step 300, operation proceeds to step 288.

Referring back to step 290, if the CHRGER flag is not set, then the battery 28 is discharging or otherwise not present and operation proceeds to step 294 where the voltage of the VBAT+ signal is compared to 17 volts. To perform this step, the VCCON and VRES signals are asserted to measure the VBAT+ signal at low resolution through the VBATT signal. Since the voltage of battery 28 should never go above 17 volts, this step determines whether the AC adapter A is installed and powered. If the VBAT+ signal is not greater than 17 volts, operation proceeds to step 296 where the voltage of the VBATT signal is measured in the same manner and compared to 9 volts. If the voltage is above 9 volts, operation proceeds to step 298 from step 296. Referring back to step 280, if the voltage of the TEMP signal is less than or equal to 4 volts, operation proceeds to step 302 where the TFAIL flag is cleared indicating that the temperature sensor TS is operating correctly. Operation then proceeds to step 304 from step 302 where the RAMPRS flag is checked to determine if the RAM/RTC 40 is present. If so, operation proceeds to step 306 where the RTCFAIL flag is cleared indicating that the RAM/RTC 40 is operating properly. From step 306, operation proceeds to step 288. If the RAMPRS flag indicates the RAM/RTC 40 is not present in step 304, operation proceeds to step 300 indicating a failed RAM/RTC 40.

Referring back to step 294, if the voltage of the VBAT+ signal is greater than 17 volts, operation proceeds to step 308 where the BRIDGE, signal is negated high to allow other devices to place the computer system C in standby mode. At this point, it is determined that the AC adapter A is providing power to the computer system C although the battery pack B is not present. From step 308, operation proceeds to step 310 where the AUXON and AUXCHG signals are asserted to enable charging or discharging of the auxiliary battery 22 since the AC adapter A is installed and powered on. Also, the LWBT1 and LWBT2 flags are cleared and a new battery flag, referred to as NEWBAT, is set so that when a new battery pack B is installed, an initialization routine is executed as will be described below. Operation then proceeds to step 312 from step 310 where the AC MOSFET 31 is turned on by asserting the ACON signal, the ACFLAG flag is set, and the BATTIN flag is cleared indicating that there is no battery pack B installed in the computer system C. From step 312, operation returns to step 254 to begin the main loop of the firmware.

Referring back to step 296, if the voltage of the VBAT+ signal is less than or equal to 9 volts, then operation proceeds to step 314 where the AUXON signal is monitored to determine whether the auxiliary battery 22 is discharging. If not, operation proceeds back to step 264 where the power is turned off since the voltage has fallen below the minimum voltage level. Otherwise, operation proceeds to step 316 from step 314 where the AC MOSFET 31 is turned off by negating the ACON signal low and the FCFET signal is asserted low. The NEWBAT flag is set and the FASTB, ACFLAG, RTCFAIL, TFAIL, LWBT1, LWBT2 and BATTIN flags are all cleared. Also, the battery LED 24 is turned off by negating the BATLED signal. From step 316, operation proceeds to step 318 where the STBY flag is monitored to determine if standby is on. If not, operation returns to step 264 to turn the power off. Otherwise, operation proceeds to step 320 where the voltage of the VBAT+ SIGNAL is compared to 10 volts. If the VBAT+ signal is less than 10 volts, operation proceeds to step 264 to turn the power off since the minimum allowable voltage has been reached. If the voltage is greater than or equal to 10 volts, operation proceeds to step 322 where the AUXCHG signal is asserted to reduce the voltage drop in standby mode and the BRIDGE* signal is asserted low to prevent other devices from waking up the keyboard controller 21 of the computer system C since only the auxiliary battery 22 is discharging and providing power. From step 322, operation returns to step 254 to begin the main loop again.

Beginning at step 324, the NEWBAT flag is checked to determine if a new battery pack B has been installed in the computer system C. Recall that the NEWBAT flag is only set in steps 308 or 316 when the battery 28 is not present, and that step 324 is executed after the battery 28 is subsequently detected present in step 288. If so, operation proceeds to step 326 where the NEWBAT, LWBT1 and LWBT2 flags are cleared and the UPDATE flag is set indicating that it is time to update the RAM/RTC 40. Operation then proceeds to step 328 where a TIMER2 timer interrupt routine (FIG. 6) is called to read the data from the ROM within the RAM/RTC 40 of the new battery pack B, and where this data is stored in the memory of the microcontroller 72. This procedure is performed when a new battery pack B is installed in the computer system C, and every 27 seconds thereafter described below.

The data stored in the ROM of the RAM/RTC 40 comprises 8 bytes, where the first byte is a predetermined family code preferably defined as 0Ch, which is verified to prevent unauthorized duplication. The letter h represents hexadecimal notation. The second byte comprises two nibbles, each nibble being 4 bits wide, where the first nibble defines a maximum temperature offset from 50° C. and the second nibble defines the battery 28 type ranging from 0 to 0Dh. The third byte contains the denominator in TOFU units. The fourth and fifth bytes are the LOWBAT1 and LOWBAT2 voltage set points, respectively, where each bit preferably represents 0.047 volts. The SLOWBAT1 and SLOWBAT2 voltage set points are derived by adding 200 mV to the LOWBAT1 and LOWBAT2 set points, respectively. The sixth and seventh bytes comprise four nibbles representing the self discharge rates of the battery 28, where the first nibble represents the self discharge rate from 0–6 hours (1.75 mAh per bit), the second nibble represents the self discharge rate from 6–12 hours (0.875 mAh per bit), the third nibble represents the self discharge rate from 12–48 (0.4375 mAh per bit) and the last nibble represents the self discharge rate for greater than 48 hours (0.21875 mAh per bit). The eighth byte is a cyclical redundancy checking (CRC) byte as known to those skilled in the art.

From step 328, operation proceeds to step 330 where the fuel gauge is checked for validity. The data is considered invalid if an error occurred while reading the RAM/RTC 40 as determined by the CRC byte, or if the family code does not match the predetermined value. If the fuel gauge is valid, operation proceeds to step 332 where the fuel gauge numerator is compared to a low value representing a depleted battery 28, where the low value is preferably approximately 224 mAh. If the fuel gauge numerator reads less than the low value in step 332, operation proceeds to step 334 where the LWBT1 and LWBT2 flags are set. Operation then proceeds to step 338 from step 334. Referring back to step 330, if the fuel gauge read in step 328 is not valid, operation proceeds to step 336 where a FUELOK flag and the PULSE and FCHRG flags are cleared and the fuel gauge numerator is set equal to a default value.

From the steps 332,334 or 336, operation proceeds to step 338 where the BRIDGE, signal is negated high. Operation then proceeds to step 340 where the voltage of the VBAT+ signal is compared to 17 volts in a similar manner as described previously. If the VBAT+ signal is less than or equal to 17 volts in step 340, operation proceeds to step 342 where the CHRGER flag is checked to determine if the battery 28 is charging or discharging. If the battery 28 is not charging in step 342, operation proceeds to step 384 described below. Otherwise, if the battery 28 is charging in step 342 or if the VBAT+ signal is greater than 17 volts as determined in step 340, operation proceeds to step 344 where the CHRGER flag is set to enable fast charging, the ACFLAG flag is set to indicate that the AC adapter A is available and the AUXON and AUXCHG signals are asserted thus allowing the auxiliary battery 22 to be charged. The discharge time counter is also reset in step 344 to begin the 5-minute countdown of discharging of the battery 28.

From step 344, operation proceeds to step 346 to sample the FCHRG flag to determine if the battery 28 is fully charged. If so, operation proceeds to step 348 where the FCFET and the BATLED signals are negated to terminate fast charging of the battery 28 and to turn off the battery LED 24. Also, the FASTB flag is cleared to indicate that the battery 28 is no longer being fast charged. From step 348, operation returns to step 254.

Referring back to step 346, if the FCHRG flag indicates that the battery 28 is not charged, operation proceeds to step 350 to determine if there has been an error in the battery pack B, where the RTCFAIL and TFAIL flags and a flag ROMFAIL are checked. The ROMFAIL flag is set if an error occurs any time when reading the ROM contents of the RAM/RTC 40 after the battery pack B has been removed from the computer system C and re-installed, or if a new battery pack B is installed.

If any of the error flags indicate an error, operation proceeds to step 348 to terminate fast charging. Otherwise, operation proceeds to step 352 where the FASTB flag is checked to determine if the battery 28 is fast charging. If not, operation proceeds from step 352 to step 354 to determine if there is less than approximately 87% of full charge remaining in the battery 28. If the battery 28 has a charge of at least 87% of full charge, operation proceeds to step 355 where the LWBT1 and LWBT2 flags are cleared. Operation then proceeds to step 356 where the PULSE flag is checked to determine if pulse trickle charging is already occurring. If so, operation proceeds to step 357 to determine if the fuel gauge reads greater than 100% of the full charge capacity of the battery 28. If the numerator indicates a greater charge than 100% of the denominator, operation proceeds to step 358 where the FCHRG flag is set indicating that the battery 28 is fully charged. Further, the PULSE flag is cleared to terminate pulse trickle charge, the CAL flag is cleared, and the FUELEN flag is cleared to disable fuel gauge calibration. From step 358, operation proceeds to step 348.

Referring back to step 357, if the fuel gauge reads less than 100%, operation proceeds to step 348. Referring back to step 356, if the PULSE flag is false, operation proceeds to step 362 where the PULSE flag is set. From step 362, operation proceeds to step 348. Referring back to step 354, if the fuel gauge reads less than 87%, operation proceeds to step 360 where the temperature and voltage of the battery 28 are checked to determine whether they are within the proper range for fast charging. The temperature should preferably be between 10° and 40° C. and the voltage should be at least 10 volts or above. If these conditions are not met, then the battery 28 is not ready for fast charge and operation proceeds to step 362. Otherwise, if the voltage and temperature of the battery 28 are within the proper ranges, operation proceeds to step 364 where fast charging of the battery 28 is initiated. To do so, the FCFET and BATLED signals are asserted to turn on the MOSFET 74 and to turn on the battery LED 24. Also, the FASTB flag is set as well as the CAL flag. Furthermore, the initial temperature of the battery 28 is saved for comparison in step 368, described below.

From step 364, or if the FASTB flag was detected set in step 352, operation proceeds to step 366 where the temperature of the battery 28 is compared to a maximum allowable temperature, which is calculated by adding the maximum temperature offset stored in the RAM/RTC 40 to 50° C. This value depends upon the particular battery 28 of the battery pack B. If the temperature of the battery 28 has exceeded the maximum allowable temperature, operation proceeds to step 367 where the CAL flag is cleared indicating abnormal fast charge termination. Operation then proceeds to step 348 to terminate fast charging. If the temperature has not exceeded the maximum, operation proceeds to step 368 from step 366 where it is determined whether the temperature of the battery 28 has risen a predetermined amount during a zero or negative change in voltage of the battery 28. The predetermined amount is stored in the RAM of the microcontroller 72 as a value RTCH, and is compared to the initial value stored in step 364. Further details will be provided below. If the temperature has risen the predetermined amount during a zero or negative change in voltage, operation proceeds to step 370 from step 368 where it is determined whether the fuel numerator is greater than 75% of the denominator. If so, operation then proceeds to step 372 where the battery 28 is considered fully charged and the FCHRG flag is set and the PULSE flag is set to allow the two hour pulse trickle charging to occur. The LWBT1 and LWBT2 flags are also cleared in step 372. Operation then proceeds to step 348 to turn off the MOSFET 74 to terminate fast charging.

It is noted that in steps 368 and 370, the microcontroller 72 continues to monitor the voltage, temperature, and charge current of the battery 28 using the A/D converter for fast charge termination and fuel gauge update functions. To detect a negative delta voltage, the voltage measurements of the battery 28 are digitally filtered using a sample or average probability method in the preferred embodiment. Preferably, 128 voltage measurements of the VBATT signal are collected in the following fashion. A frame of 16 voltage samples is collected during a fixed time interval, which is preferably 13.65 seconds, where each voltage sample is the average of 8 consecutive voltage point measurements each taken approximately every 10 ms for a total of approximately 0.85 seconds for each voltage sample. Moreover, each voltage sample is added to a RAM register during each voltage frame. At the end of each frame or 16 voltage samples, the register contains the sum of the 16 voltage measurements. The average voltage for each frame is then obtained by dividing the sum by 16 or by right shifting the RAM register 4 times. Finally, the delta or change in voltage is acquired from the difference between two consecutive voltage frames. As long as the charge voltage is above a certain minimum, which is preferably approximately 14.5 volts, a negative delta voltage is considered to exist if the A/D drops 4 bits or more in two consecutive frames when the computer system C is powered on, or if the A/D drops 2 bits or more when the power is off.

Since the temperature of the battery 28 rises abruptly when it is fully charged, the charge temperature is measured only during a zero or negative delta voltage between two consecutive frames as described above. A counter is incremented whenever the temperature of the battery 28 is rising during a zero or negative delta voltage frame. This counter, however, is reset or cleared when the difference between voltages is positive or if the temperature of the battery 28 is decreasing. If the counter reaches a predetermined count, which is preferably 10, the possibility of the battery 28 being fully charged is extremely high and fast charge is terminated. Nevertheless, the change in temperature should only occur when the fuel gauge numerator indicates that the battery 28 is greater than 75% full, as determined in step 370, since otherwise the probability of the battery 28 being fully charged is low.

If the fuel gauge numerator reads less than or equal to 75% of the denominator in step 370, operation proceeds to step 371 where the CAL flag is cleared. If the delta temperature and delta voltage conditions are not met in step 368 or after step 371 is executed, operation proceeds to step 374 to compare the fuel gauge numerator with the minimum value, which is preferably 224 mAh. If the numerator is greater than this minimum value in step 374, operation proceeds to step 376 where the LWBT1 and LWBT2 flags are cleared. Operation then proceeds from step 376 to step 378 where the fuel gauge numerator is compared to a certain high capacity value, which is preferably is 125% of the denominator. If the fuel gauge numerator has not reached this certain maximum amount in step 378, or if the numerator is less than the minimum amount in step 374, operation returns back to step 254.

If the numerator is greater than 125% in step 378, operation proceeds to step 380 where the CAL flag is monitored. If the CAL flag is not set as determined in step 380, operation proceeds to step 372 where the battery 28 is considered fully charged. Otherwise, operation proceeds to step 382 where the fuel gauge calibration is enabled by setting the FUELEN flag, and then operation proceeds to step 372. It is noted that the steps 374 and 378 represent abnormal termination conditions, where fuel gauge numerator has become greater than the maximum value or has fallen to the minimum value during fast charging. If either of these abnormal conditions are detected, fuel gauge calibration does not occur and fast charge is terminated.

The flowchart diagram illustrates the operation of the firmware executed by the microcontroller 72 if the AC adaptor A is detected not present and the battery pack B is present. In step 384, the FASTB and ACFLAG flags are cleared and the FCFET signal is asserted to reduce voltage drop and allow discharging of the battery 28. Operation then proceeds to step 386 where the PWRON flag is checked to determine if the power is on. If not, operation proceeds to step 388 where the AC MOSFET 31 is turned off and the AUXON and the AUXCHG signals are negated to prevent charging or discharging of the auxiliary battery 22. It is noted that the auxiliary battery 22 is charged during normal operating mode regardless of the power source, or if the computer system C is off and the AC adapter A is available. From step 388, operation proceeds to step 418 described below. If the power is on in step 386, operation proceeds to step 390 where the AUXON signal is asserted to allow discharging of the auxiliary battery 22 and the AC MOSFET 31 is turned off by negating the ACON signal.

Operation then proceeds to step 396 where the STBY flag is checked to determine if the computer system C is in standby mode. If the standby flag is set in step 396, operation proceeds to step 400 where a hibernation flag, referred to as HIBR1, is checked to determine if the hibernation mode is disabled. If the hibernation mode is disabled in step 400 or if the standby flag is not set in step 396, operation proceeds to step 398 where the hibernation timer is reset. Operation then proceeds to step 406 described below. If the hibernation mode is not disabled in step 400, operation proceeds to step 402 where it is determined if the hibernation timer has timed out as indicated by the HIBER bit. If so, operation proceeds to step 404 where the keyboard controller 21 is awakened by asserting the WAKE* signal low and fuel calibration is disabled by clearing the CAL flag. Recall that the HIBER bit is received by the host computer 20 as the least significant bit of the third byte of serial data sent to the host computer 20 on the COMM signal. The host computer 20 preferably shuts the computer system C down upon detecting the HIBER bit set by asserting the PWROFF* signal low. From step 404, operation proceeds to step 398.

Referring back to step 402, if the hibernation timer has not timed out, operation proceeds to step 406 where the VBAT+ signal is compared to 12 volts. If the voltage is above 12 volts, operation proceeds to step 407 where the AUXCHG signal is asserted to allow charging of the auxiliary battery 22. Operation then proceeds to step 408 where the FCHRG flag is checked to determine if the battery 28 has been charged or not. If the battery 28 has been charged in step 408, operation proceeds to step 410 where the fuel gauge numerator is checked to determine if it is greater than 87% of full charge. If the numerator is greater than 87% in step 410, operation proceeds to step 412 where the discharge time counter is checked to determine if the battery 28 has been discharging for at least 5 minutes. If the battery 28 has been discharging for 5 minutes as determined in step 412, or if the numerator is less than or equal to 87% in step 410, operation proceeds to step 414 where the battery 28 is indicated as not being fully charged and the PULSE and FCHRG flags are cleared. If the discharge time counter has not timed out in step 412 or after step 414 is executed, or if the battery 28 is indicated as not being charged in step 408, operation proceeds to step 416 where the STBY flag is checked. If the STBY flag is not set in step 416, operation proceeds back to step 254. If the STBY flag is detected set in step 416, operation proceeds to step 418 where the BRIDGE* signal is asserted low, the WRVALID flag is cleared so that old data is not used, the PWRLED signal is negated to turn the power LED 25 off and standby mode is entered. From step 418, which indicates standby mode, operation proceeds to step 254 when standby mode is exited. Standby mode is exited when the WAKE-UP signal is asserted high, as detected at the *HOLD input pin.

Referring back to step 406, if the VBAT+ signal is not greater than 12 volts, operation proceeds to step 420 where the voltage of the battery is measured in high resolution by negating the VRES signal and monitoring the voltage at the VBATT signal. Also, the AUXCHG signal is negated low turning off the MOSFET 152 to prevent charging of the auxiliary battery 22 since the AC adapter A is not available and the voltage of the battery 28 is too low. From step 420, operation proceeds to step 422 where the FCHRG and PULSE flags are cleared to indicate that the battery 28 is not fully charged. From step 422, operation proceeds to step 424 where the VBAT+ signal is compared to 10 volts. If the VBAT+ signal is not greater than 10 volts, operation proceeds to step 264 described previously. Otherwise, if the VBAT+ signal is greater than 10 volts, operation proceeds to step 425 where the LWBT2 flag is checked. If the LWBT2 flag is set, operation proceeds to step 427 where the BRIDGE* signal is negated high and the FCHRG flag is cleared indicating that the battery 28 is not fully charged. From step 427, operation proceeds to step 254.

Referring back to step 425, if the LWBT2 flag is not set, operation proceeds to step 426 where the STBY flag is checked. If the STBY flag is set, operation proceeds to step 428 where the voltage of the battery 28 is measured to determine if it has reached the SLOWBAT1 voltage set point. If not, operation proceeds to step 432 described below. If the SLOWBAT1 voltage set point has been reached in step 428, operation proceeds to step 430 where the voltage of the battery 28 is compared to the SLOWBAT2 voltage set point. Operation then proceeds from step 430 to a debounce step 432, where digital filtering of the voltage of the battery 28 occurs to determine whether it has actually reached the SLOWBAT1 and SLOWBAT2 set points. Effectively, the firmware continually measures the voltage of the battery 28 and uses a probability method. In the preferred embodiment, it is determined that a low voltage battery set point has been reached when the probability is 70% or greater. Given a fixed period, which is preferably approximately ten seconds, where one voltage sample occurs in approximately one second, if the number of samples measured below a low voltage set point occurs more than seven times out of ten, then the probability that this voltage has been reached is 70%.

If the battery 28 continues to discharge beyond the LOWBAT2 or SLOWBAT2 voltage set points to its minimum operating or threshold voltage while the power is on, the output must be inhibited. Therefore, the steps 428, 430 and 432 are executed several times incrementing appropriate counters for each iteration of the firmware to determine whether the corresponding set point has been reached. If the SLOWBAT2 voltage set point has been reached in step 432, operation proceeds to step 434 where the BRIDGE, signal is negated and the WAKE, signal is asserted to wake up the keyboard controller 21. From step 434, operation proceeds to step 436 where the LWBT2 flag is set and the fuel gauge denominator is calibrated if the CAL and FUELEN flags are true and the numerator is not zero. The numerator is divided by two and subtracted from the denominator, where this factor of two assures that the denominator is not calibrated too quickly. The fuel gauge calibration CAL flag is then cleared, and fuel gauge calibration is temporarily disabled to prevent it from being performed twice in a row. From step 436, operation proceeds to step 438 where the LWBT1 flag is set. From step 438, operation proceeds back to step 254. Referring back to step 432, if the SLOWBAT1 set point is reached but the SLOWBAT2 set point has not been reached, operation proceeds directly to step 438 to set the LWBT1 flag. Otherwise, if both LWBT1 and LWBT2 flags are set in step 432, operation proceeds to step 434. The computer system C is eventually placed in hibernation mode or shut off in this case.

Referring back to step 426, if the STBY flag is not set, operation proceeds to step 440 where the voltage of the battery 28 is compared to the LOWBAT1 voltage set point. Step 440 is similar to step 428 except the voltage is compared to the LOWBAT1 set point rather than the SLOW-BAT1 set point. If the LOWBAT1 voltage set point is reached in step 440, operation proceeds to step 442, which is analogous to step 430 except that the voltage level is compared to the LOWBAT2 set point. From steps 440 and 442, operation proceeds to step 444, which is similar to step 432 and where a similar probability method is executed. From step 444, operation proceeds to step 436 if the LOW-BAT2 set point is reached, to step 438 if the LOWBAT1 set point is reached or to step 254 if both set points have been reached.

Figure 5:
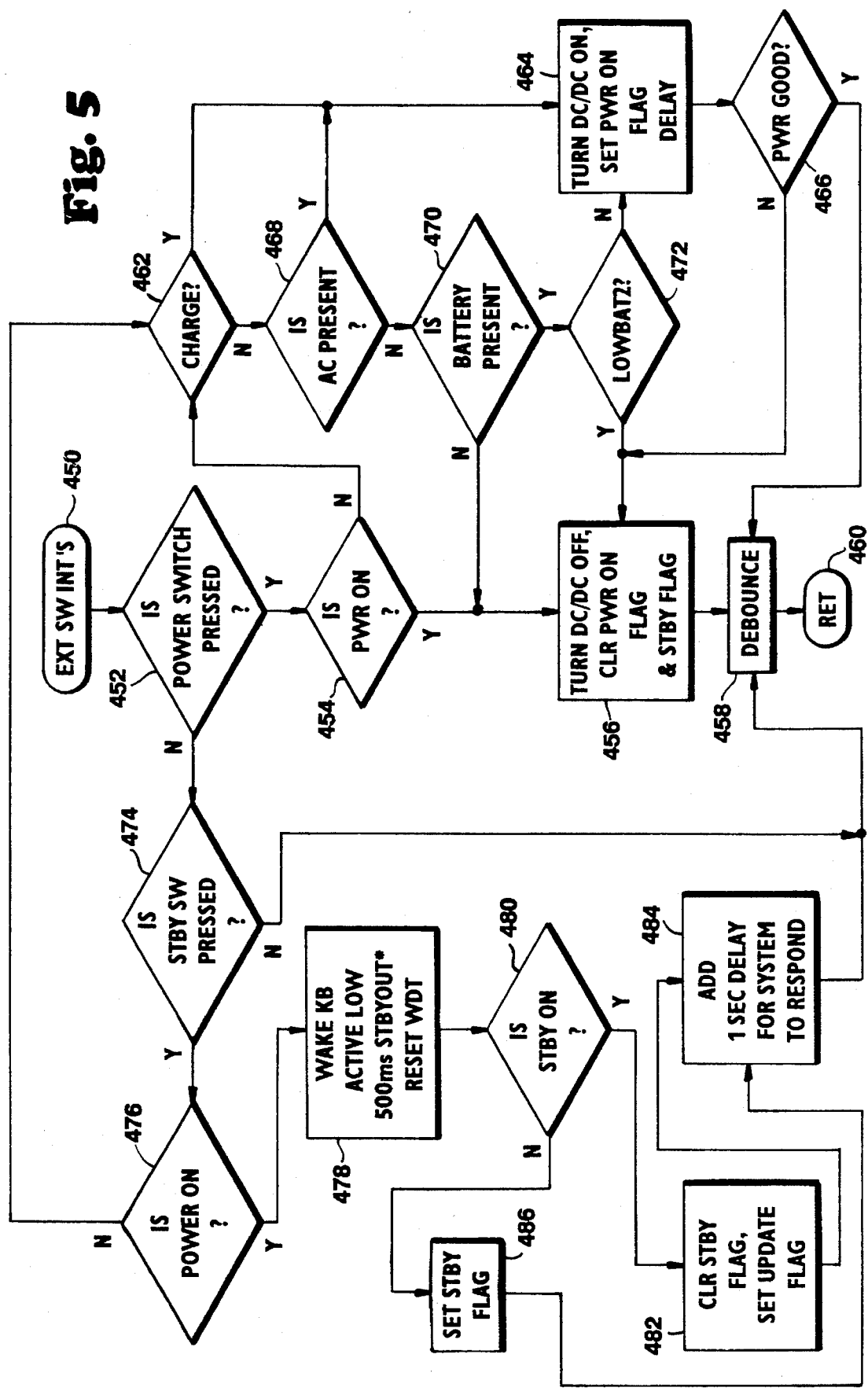
FIG. 5 is a flowchart diagram illustrating an external power and standby switch routine operating on the microcontroller of FIG. 3.

Referring now to FIG. 5, a flowchart diagram is shown illustrating a power and standby switch routine, which is executed every time the EXT SW INTS signal is detected asserted high on the *INT1 pin of the microcontroller 72. This occurs when either the power switch 26 or the standby switch 23 is pressed. The main loop of the microcontroller 72 is interrupted at step 450 where operation proceeds to step 452, where the EXT PWR ON signal is monitored to determine if the power switch 26 was pressed. If so, operation proceeds to step 454 where the PWRON flag is checked to determine if the power is already on. If so, operation proceeds to step 456 where the PWRON and STBY flags are cleared, and the computer system C and the battery LED 24 and power LED 25 are turned off. Eventually, the DC—DC controller 27 turns off the DC—DC power circuit 29 by negating the PWRONLO signal, so that the voltage outputs of the DC—DC power circuit 29 are disabled. From step 456, operation proceeds to step 458 where a debounce routine is executed, which is essentially a relatively long delay to wait out the bounce period of either the power switch 26 or the standby switch 23. From step 458, operation proceeds to step 460 to return to the main loop.

Referring back to step 454, if the PWRON flag is not set, operation proceeds to step 462 where the CHRGER flag is monitored to determine if the battery 28 is charging or discharging. If charging, operation proceeds to step 464 where a routine is executed to turn the DC—DC power circuit 29 on. The STBY flag is cleared, the PWRONL signal is asserted and the PWRLED signal is also asserted to turn on the power LED 25. A timer in the microcontroller 72 waits approximately one second for the PGD signal to be returned from the DC—DC power circuit 29 to assure that the DC—DC power circuit 29 is operating properly. Due to the long delay, the watchdog timer is also reset to assure that it does not time out. Operation proceeds from step 464 to step 466 to monitor the PGD signal. If the PGD signal is not asserted in step 466, operation proceeds to step 456 to turn off the DC—DC converter D. Otherwise, if the PGD signal is asserted in step 466, operation proceeds to debounce step 458.

Referring back to step 462, if the battery 28 is discharging, operation proceeds to step 468 where the ACFLAG flag is sampled to determine if the AC adapter A is present. If so, operation proceeds to step 464. Otherwise, operation proceeds to step 470 where the BATTIN flag is monitored to determine if the battery 28 is present. If the battery 28 is not present in step 470, operation proceeds to step 456 to turn off the DC—DC controller D. Otherwise, if the battery 28 is present, operation proceeds to step 472 where the LWBT2 flag is monitored to determine if it has been previously set. If so, operation proceeds to step 456 to turn off the DC—DC controller D. Otherwise, operation proceeds to step 464 to turn on the DC—DC controller D.

Referring back to step 452, if the power switch 26 has not been pressed, operation proceeds to step 474 to determine if the standby switch 23 was pressed as indicated by the STBYSW and the EXT STBY ON signals. If the standby switch 23 was not pressed, operation proceeds to debounce step 458. Otherwise, operation proceeds to step 476 where the PWRON flag is checked to determine if power is on. If not, operation proceeds to step 462 as described previously. Otherwise, if the PWRON flag is set in step 476, operation proceeds to step 478 where the WAKE* signal is asserted low to wake up the host computer 20. Also, in step 478, the STBYOUT* signal is asserted to the host computer 20 and the watchdog timer is reset. Operation then proceeds to step 480 where the STBY flag is checked to determine if standby mode is indicated. If so, operation proceeds to step 482 where the STBY flag is cleared and the UPDATE flag is set. Operation proceeds from step 482 to step 484 where a one-second delay is added to allow the host computer 20 to respond. From step 484, operation proceeds to debounce step 458.

Referring back to step 480, if the STBY flag is not detected set, operation proceeds to step 486 where the STBY flag is set, and operation then proceeds to step 484.

Referring now to FIG. 6, a flowchart diagram is shown illustrating an update RAM/RTC routine executed by the microcontroller 42 when called by the main routine upon power up or if a new battery 28 is installed, or when the TIMER2 timer interrupt occurs, which preferably occurs once approximately every 27 seconds. Operation begins at step 500 and proceeds to step 502. In step 502, the SERON flag is monitored to determine if the host computer 20 is sending data on the COMM signal. If so, operations proceed to step 504 where a shorter response period is programmed, such as 5 seconds for example, so that the update RAM/RTC routine is operated sooner than 27 seconds. Operation then exits at step 506 where the main routine is reentered at the point it was exited.

Referring back to step 502, if the COMM signal is not busy and the host computer 20 is not sending data, operation proceeds to step 508 where the UPDATE flag is checked to determine if it is time to update the data of the microcontroller 72 with the ROM contents of the RAM/RTC 40. If the UPDATE flag is true in step 508, operation proceeds to step 510 where the ROM data, the present value and the timestamp value of the RTC from the RAM/RTC 40 are read. From step 510, operation exits through step 506.

The RAM/RTC 40 preferably includes a 5 byte counter to implement the RTC portion, which is continually incremented 256 times per second while the RAM/RTC 40 receives power. The first and least significant byte counts fractional seconds, each bit representing 1/256 seconds, and the remaining 4 bytes of this counter measure elapsed time for up to 136 years in seconds. Only the 3 most significant bytes of this RTC counter are read since this provides the number of elapsed hours within about 5 minutes. When the battery pack B is first installed into the computer system C, a timestamp value is read from the RAM of the RAM/RTC 40 as indicated in step 510, which indicates the value of the RTC timer when the battery pack B was previously removed. The present time value of the RTC timer is also retrieved. The timestamp value is then subtracted from the present time value to determine the elapsed time in seconds, and this value is converted to hours and compared to the four self-discharge time ranges described previously, where these ranges are 0–6 hours, 6–12 hours, 12–48 hours, and greater than 48 hours. Once the self-discharge rate is determined, the elapsed time is converted to TOFU units representing the charge lost through self-discharge, and this value is subtracted from the numerator.

If it is not time to update as determined in 508, operation proceeds to step 512 where 3 bytes of the RTC time value are read. Operation then proceeds to step 514 where the present RTC time value and fuel gauge data is written to a buffer or scratchpad located within the RAM/RTC 40. Operation then proceeds to step 516 where the RTC and fuel gauge data is verified by reading the data and also retrieving an access code from the RAM/RTC 40. Operation proceeds to step 518 where the fuel gauge and RTC data is transferred from the scratchpad to actual RAM location in the RAM/RTC 40 using the access code to complete the write. The use of the scratchpad in the RAM/RTC 40 assures that valid data is always present even if the routine is interrupted, such as if the battery pack B were removed while copying the data. In this manner, the timestamp value, the numerator and the denominator are updated once approximately every 27 seconds while the battery pack B is installed into the computer system C. Operation then exits through step 506.

Referring now to FIG. 7, a flowchart diagram is shown illustrating a host serial routine which is executed when the COMM signal is detected asserted. Operation begins at step 530 and proceeds to step 532 where the direction of data flow is determined. If the microcontroller 72 is sending data, operation exits at a return step 538. Otherwise, if the host computer 20 is sending data, operation proceeds from step 532 to step 534 where the data retrieved from the host computer 20 is read and saved. The firmware of the microcontroller 72 communicates with the host processor of the host computer 20 for status reporting and configuration parameters updating on the COMM signal. The direction of data flow is determined by the TXDINH, signal, where the microcontroller 72 receives data when the TXDINH* signal is asserted low, and transmits data if the TXDINH* signal is negated high. The host computer 20 preferably asserts the TXDINH* signal low for a minimum of approximately 250 ms before transmitting any data, and holds this signal low during the entire access to ensure data validity. The serial protocol is the same as the serial output of the microcontroller 72, which is a 10-bit UART format with 1 start bit, 8 data bits and 1 stop bit, preferably executed at 1200 BAUD.

The host computer 20 may either read from or write to the microcontroller 72. The host read mode comprises one address byte, where the most significant bit (MSB) of the address byte determines the host read/write mode and is set to zero for the host read mode. The remaining 7 bits in the read address byte contains an address offset for the particular data being read. The address offset is multiplied by two and added to another memory offset, which is preferably 80h, to yield a physical RAM location in the RAM of the microcontroller 72. When the microcontroller 72 detects a host read operation, it responds by sending the addressed data byte within 50 ms in the same serial format.

If the MSB of the address byte is a one, a host write operation is indicated and the address byte is followed by one data byte. A 10–50 ms delay is preferably inserted between the address and data bytes. The addressed location is calculated the same way as described above, where the firmware of the microcontroller 72 multiplies the address offset by two and adds the 80h offset. The host accessible RAM in the microcontroller 72 preferably contains only the control parameters of the battery 28, and these RAM locations are common to both the host computer 20 and the microcontroller 72.

The microprocessor 72 RAM memory locations accessible by the host computer 20 are listed in Table I:

TABLE 1

MEMORY LOCATIONS OF THE MICROCONTROLLER 72 ACCESSIBLE BY THE HOST COMPUTER 20

| ADDR | HOST ADDRESS OFFSET | NAME | SIZE | UNIT/BIT |
|------|------|------|------|------|
| 80h | 00 | BTEMP | 8 bytes | |
| 90h | 08h | MINIVOLT | 1 byte | 20V/255 |
| 92h | 09h | TMPMAX | 1 byte | See Note |
| 94h | 0Ah | LOWBT1 | 1 byte | 12V/255 |
| 96h | 0Bh | LOWBT2 | 1 byte | 12V/255 |
| 98h | 0Ch | SLOWBT1 | 1 byte | 12V/255 |
| 9Ah | 0Dh | SLOWBT2 | 1 byte | 12V/255 |
| 9Ch | 0Eh | HIBTIM | 1 byte | 30 min |
| A0h | 10h | DENO | 3 bytes | 14mAh/8192 |
| A6h | 13h | NUMER | 3 bytes | 14mAh/8192 |
| AEh | 17h | FCYCLE | Lower nibble | |
| AFh | 17h | CKEND | Higher nibble | |
| B0h | 18h | FIRMxx | Lower nibble | |
| B1h | 18h | RTCH | Higher nibble | |
| B2h | 19h | SELFDC1 | Lower nibble | 14mAh/64 |
| B2h | 19h | SELFDC2 | Higher nibble | 14mAh/32 |
| B3h | 1Ah | SELFDC3 | Lower nibble | 14mAh/16 |
| B3h | 1Ah | SELFDC4 | Higher nibble | 14mAh/8 |

Note:
The value of Maximum Charge Temperature can be derived from the following formula: Value = Integer ((86.7 − desired max temp)/0.83).

The true address is indicated by the value ADDR and is derived by multiplying the host address offset by two and adding 80h. The memory defined as BTEMP is a RAM scratchpad used for data verification purposes when reading data from the RAM/RTC 40, in a similar manner as described for the RAM/RTC 40. The value MINIVOLT is the minimum charge voltage, and the value TMPMAX is the maximum charge temperature which is calculated according to the formula found in the note at the end of TABLE I. The values LOWBT1, LOWBT2, SLOWBT1 and SLOWBT2 correspond to the LOWBAT1, LOWBAT2, SLOWBAT1 and SLOWBAT2 set point voltages, respectively. The hibernation timer time HIBTIM defines the amount of time that is programmed into the hibernation timer. The computer system C shuts down if the hibernation timer times out while in the standby mode. The DENO and NUMER values correspond to the denominator and numerator, respectively. The partial fast charge cycle is a count of the number of consecutive times the battery 28 is only partially discharged and then fast charged before being fully discharged. If the number of partial charge cycles as indicated by FCYCLE reaches a predetermined value, which is preferably 13, then the fuel gauge data may become inaccurate and fuel gauge calibration is disabled. Calibration is re-enabled when the battery 28 is fully discharged. CKEND is a checksum value for the RAM/RTC 40 and FIRMxx defines the firmware version operating on the microcontroller 72. The temperature rise count represents the maximum allowable temperature rise during a zero or negative delta voltage of the battery 28 as determined in step 368. The self discharge rate SELFDC1, SELFDC2, SELFDC3 and SELFDC4 are defined for ranges greater than 48 hours, greater than 12 up to 48 hours, greater than 6 up to 12 hours, and 6 hours or less, respectively.

Operation proceeds to step 536 from step 534 where the data is decoded and stored and the appropriate flags are set. The routine then exits at step 538 back to the main loop.

The beneficial aspects of a battery charge monitoring system according to the present invention can now be appreciated with reference to the preferred embodiment. The battery pack B includes a RTC for measuring elapsed time and a RAM/RTC 40 which includes a ROM portion storing the operating parameters of the battery 28, including the battery type, the maximum charge temperature, the original charge capacity of the battery 28 and the low voltage set points. The RAM/RTC 40 includes a RAM portion for storing charge status information including a timestamp value from the RTC, the numerator and the denominator. A communication means is provided for interfacing with the computer system C. The computer system C includes a DC—DC controller 27 which includes a microcontroller 72 for communicating with the RAM/RTC 40. The microcontroller 72 retrieves the ROM data from the battery pack B and controls the charging status based on this information. The microcontroller 72 further continually updates the numerator and timestamp and periodically recalibrates the denominator in the RAM/RTC 40. The microcontroller 72 also includes local RAM and transceiver means for communicating the battery information to the host computer 20.

A MOSFET 74 acts as a fast charge switch placed in the current path of the battery 28, so that the microcontroller 72 controls the charging condition and status of the battery 28. Trickle charge is simulated by asserting a pulse signal to the MOSFET 74 turning it off and on at predetermined intervals as controlled by the microcontroller 72. The average amount of current through the battery 28 is controlled by the duty cycle and period of the pulse signal, and is set to the approximate level of a steady state trickle charge current level. In this manner, trickle charging is simulated using the microcontroller 72 without additional trickle charge circuitry and without expensive and sophisticated current measuring circuits typically required to implement trickle charging.

The microcontroller 72 is also implemented to monitor the standby switch 23 and to control the standby functions. These functions were previously performed either by the keyboard controller 21, which consumed valuable power since it could not be powered down, or by an expensive ASIC. Since the microcontroller 72 is also implemented to include a standby mode and to wake up periodically or if the standby switch 23 is pressed, a considerably amount of power is saved since the keyboard controller 21 is shut down.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A removable battery pack for providing power to a computer system, the computer system including a microcontroller for detecting when said battery pack is connected to the computer system, means coupled to the microcontroller for determining the amount of charge provided to and provided by said battery pack while said battery pack is connected and computer system communication means coupled to the microcontroller for communicating with said battery pack, said battery pack comprising:

a rechargeable battery;

a real time clock coupled to said battery for continually providing an indication of the present time; and memory coupled to said battery for storing a timestamp value of said present time indication and a numerator value representing the remaining charge of said battery at approximately the time indicated by said timestamp value, wherein the microcontroller detects said battery pack when it is initially connected to the computer system, retrieves said present time indication and said timestamp and numerator values, and thereafter periodically updates said numerator based on the amount of charge provided to and provided by said battery and also updates said timestamp value with said present time indication while said battery pack is connected to said computer system.

2. A battery pack according to claim 1, further comprising:

computer system communication means coupled to said battery, said real time clock and said memory, for coupling to the computer system communication means and for transmitting said present time indication, said stored timestamp and said stored numerator values to the microcontroller and receiving said timestamp and numerator values from the microcontroller.

3. A battery pack according to claim 2, wherein said battery pack communication means comprises a one bit wide serial communication port.

4. A battery pack according to claim 2, wherein said real time clock, said battery pack communication means and said memory are incorporated into a single semiconductor chip.

5. A battery pack according to claim 1, wherein said real time clock is a binary counter for counting elapsed time in seconds.

6. A battery pack according to claim 1, wherein said memory comprises random access memory for storing said numerator and said timestamp values.

7. A battery pack according to claim 3, wherein said memory further comprises read only memory for storing battery charging parameters.

8. A battery pack according to claim 7, wherein said battery charging parameters include a value indicative of the initial full charge capacity of said battery, a value indicative of the maximum charge temperature and a value indicative of the self discharge rate of said battery.

9. A battery pack according to claim 7, wherein said battery charging parameters include a plurality of self discharge rates corresponding to a plurality of consecutive time periods.

10. A battery pack according to claim 1, further comprising a temperature sensor coupled in good thermal contact with said battery.

11. A battery pack according to claim 1, further comprising:

a positive terminal coupled to the positive connection of said battery;

a negative terminal coupled to the negative connection of said battery;

a system ground terminal for coupling to the ground of the computer system;

an intermediate ground;

a voltage regulator coupled between said positive terminal and said intermediate ground, for providing a regulated voltage output, wherein said memory and said real time clock are coupled between said regulated voltage output and said intermediate ground; and switching means coupled between said negative terminal, said system ground terminal and said intermediate ground, wherein said switching means electrically connects said negative terminal to said intermediate ground unless a voltage greater than the voltage of said battery is applied between said positive terminal and said system ground terminal, wherein said switching means electrically disconnects said negative terminal from said intermediate ground and electrically connects said system ground terminal to said intermediate ground.

12. A battery pack according to claim 11, further comprising:

battery pack communication means, coupled between said regulated voltage output and said intermediate ground and for coupling to the computer system communication means, for transmitting said present time indication, said timestamp and said numerator values to the microcontroller and receiving said timestamp and numerator values from the microcontroller.

13. A battery pack according to claim 11, wherein said voltage regulator comprises an emitter follower transistor circuit.

14. A battery pack according to claim 11, wherein said switching means comprises Schottky diodes.

15. A battery pack according to claim 11, wherein said switching means comprises:

a first diode having its anode coupled to said intermediate ground and its cathode coupled to said system ground terminal; and a second diode having its anode coupled to said intermediate ground and its cathode coupled to said negative terminal.

16. A computer system, comprising:

a removable battery pack, comprising
  a rechargeable battery,
  a real time clock coupled to said battery for continually providing an indication of the present time,
  memory coupled to said battery for storing a timestamp of said present time indication and a numerator representing the remaining charge of said battery at approximately the time indicated by said timestamp, and
  battery pack communication means coupled to said battery, said real time clock and said memory for receiving, storing and transmitting said present time indication, said timestamp and said numerator; and a host computer for coupling to and receiving power from said battery pack, said host computer comprising:
  means for coupling to said battery pack for measuring the amount of charge provided to and provided by said battery,
  host computer communication means for coupling to said battery pack communication means for interfacing said host computer with said real time clock and said memory of said battery pack,
  means for detecting installation of said battery pack to said host computer, and
  processing means coupled to said host computer communication means, said detecting means and said measuring means, wherein said processing means retrieves said timestamp, said numerator and said present time indication after said detecting means detects installation of said battery pack, and thereafter, while said battery pack is connected to said host computer, said processing means periodically updates said numerator based on the amount of charge provided to and provided by said battery, and also periodically updates said timestamp with the current value of said present time indication.

17. A computer system according to claim 16, wherein said host computer processing means subtracts said timestamp from said present time indication upon power up and when said battery pack is initially installed during operation of the computer system and determines the self discharge of said battery pack based on the time difference.

18. A computer system according to claim 16, wherein said host computer processing means updates said numerator and said timestamp approximately twice every minute.

19. A computer system according to claim 16, wherein said battery pack memory comprises random access memory for storing said numerator and said timestamp and further comprises read only memory.

20. A computer system according to claim 19, wherein said read only memory stores a value indicative of the initial charge capacity of said battery and a value indicative of the maximum charge temperature.

21. A computer system according to claim 19, wherein said read only memory stores a value indicative of the voltage of said battery when said battery is fully discharged.

22. A computer system according to claim 19, wherein said read only memory stores a value representative of the self-discharge rate of said battery.

23. A computer system according to claim 19, wherein said read only memory stores a plurality of self discharge rates corresponding to a plurality of consecutive time periods.

24. A computer system according to claim 23, wherein said plurality of self discharge rates and corresponding time periods include:

a first self-discharge rate for a first time period;

a second self-discharge rate for a second time period, wherein said second time period starts when said first time period ends;

a third self discharge rate for a third time period, wherein said third time period begins when said second time period ends; and a fourth self-discharge rate for a fourth time period, wherein said fourth time period begins when said third time period ends.

25. A computer system according to claim 16, wherein said battery pack further comprises:

a temperature sensor in good thermal contact with said battery; and said host computer further includes means coupled to said processing means and for coupling to said temperature sensor for providing a temperature signal indicative of the temperature of said battery.

26. A computer system according to claim 25, wherein said battery pack communication means includes means for responding to an external request within a predetermined time period, said host computer further comprising:

means, coupled to said means for providing a temperature signal indicative of the temperature of said battery, for asserting a level of said temperature signal indicative of said temperature sensor not being connected, wherein said processing means provides said external request, detects said response and determines whether said temperature signal indicates said temperature sensor is not connected.

27. A computer system according to claim 25, wherein said measuring means provides a signal to said processing means indicative of the current through said battery.

28. A computer system according to claim 27, further comprising:

a removably connected AC adapter for coupling to said host computer and said battery pack, said AC adapter providing an output to power the computer system and to fast charge said battery; and said host computer further comprising:
  means coupled to said processing means and for coupling to said battery for providing a signal indicative of the voltage of said battery, and
  switching means coupled to said processing means and for coupling in the charge path of the battery, wherein said AC adapter fast charges said battery when said switching means is on and said battery is connected, and
  wherein said processing means monitors the voltage, temperature and current of said battery for determining when said battery is in a condition for fast charging and for detecting said AC adapter being connected, wherein said processing means turns on said switching means when said battery pack is installed and said AC adapter is not connected and when said AC adapter is connected and said battery is in a condition for fast charging.

29. A computer system according to claim 27, wherein said processing means updates said numerator based on the current through said battery.

30. A computer system according to claim 29, wherein:
  said battery pack memory further stores a denominator representing the charge capacity of said battery; and
  said host computer processing means calibrates said denominator after said battery has been fully charged, wherein said denominator is decreased by half the remaining value of said numerator after said battery is fully discharged if said numerator is not zero when said battery has been fully discharged, and wherein said denominator is increased by half the discharge current rate while said battery is discharging if said numerator reaches zero before said battery is fully discharged.

31. A method for determining the elapsed time during which a battery in a removable battery pack of a computer system is self-discharging, wherein the battery pack includes memory, comprising the steps of:
  the battery pack continually providing a present time value;
  detecting whether the battery pack is installed on the computer system while the computer system is powered on;
  when the battery pack is first detected installed on the computer system, retrieving the present time value and a timestamp of the present time value previously stored in the memory of the battery pack;
  subtracting the retrieved stored timestamp from the present time value to calculate the elapsed time; and
  periodically reading a new timestamp of the present time value and storing the new timestamp in the battery pack memory while the battery pack is connected to the computer system and while the computer system is powered on.

32. A method for determining the amount of self-discharge of a battery in a removable battery pack of a computer system wherein the battery pack includes memory, comprising the steps of:
  the battery pack continually providing a present time value;
  detecting whether the battery pack is installed on the computer system while the computer system is powered on;
  monitoring the amount of charge added to the battery during charging and the amount of charge removed during discharging of the battery while the battery pack is detected installed on the computer system;
  retrieving the present time value and a previously stored timestamp of the present time value from the battery pack memory when the battery pack is first detected installed on the computer system;
  subtracting the retrieved stored timestamp from the present time value to calculate an elapsed time of self-discharge;
  calculating the amount of self-discharge by multiplying the elapsed time by a predetermined self-discharge rate; and
  periodically reading a new timestamp of the present time value and storing the new timestamp into the battery pack memory while the battery pack is detected installed.

33. A method according to claim 32, further comprising the steps of:
  during said retrieving step, further retrieving a previously stored numerator from the battery pack memory representing the charge of the battery at the time represented by the stored timestamp;
  subtracting the amount of self-discharge from the retrieved stored numerator to calculate a numerator representing the remaining charge on the battery;
  while the battery pack is detected installed on the computer system, periodically updating the numerator based on the added and removed charge; and
  during said periodically reading and storing step, further storing a copy of the numerator into the battery pack memory.

34. A method according to claim 33, further comprising the steps of:
  during said retrieving step, further retrieving a previously stored denominator from the battery pack memory representing the full charge capacity of the battery;
  monitoring the voltage of the battery;
  charging the battery until it is fully charged;
  copying the denominator into the numerator;
  discharging the battery;
  increasing the denominator by an amount based on the amount of charge removed from the battery during discharging if the numerator reaches zero before the voltage of the battery reaches a predetermined minimum value;
  decreasing the denominator by the remaining numerator if the voltage of the battery reaches the predetermined minimum value before the numerator reaches zero; and
  storing a copy of the denominator into the battery pack memory when the voltage of the battery reaches the predetermined minimum value.

* * * * *

UNITED STATES PATENT AND TRADEMARK OFFICE
CERTIFICATE OF CORRECTION

PATENT NO. : 5,514,946

DATED : MAY 7, 1996

INVENTOR(S) : DAVID S. LIN

It is certified that error appears in the above-identified patent and that said Letters Patent is hereby corrected as shown below:

COLUMN 34, LINE 14, PLEASE DELETE "computer system" and insert therefor --battery pack--.

Signed and Sealed this

Fifteenth Day of October, 1996

Attest:

BRUCE LEHMAN

Attesting Officer

Commissioner of Patents and Trademarks